US009003664B2

United States Patent
Yamashita et al.

(10) Patent No.: US 9,003,664 B2
(45) Date of Patent: Apr. 14, 2015

(54) METHOD FOR PRODUCING SHAFT MEMBER FOR HYDRODYNAMIC BEARING APPARATUS

(75) Inventors: Nobuyoshi Yamashita, Kuwana (JP); Hideaki Kubota, Kuwana (JP); Natsuhiko Mori, Kuwana (JP); Keiji Nagasaki, Awara (JP); Masahiro Makino, Awara (JP)

(73) Assignees: NTN Corporation, Osaka (JP); Fukui Byora Co., Ltd., Fukui (JP)

( * ) Notice: Subject to any disclaimer, the term of this patent is extended or adjusted under 35 U.S.C. 154(b) by 90 days.

(21) Appl. No.: 13/149,313

(22) Filed: May 31, 2011

(65) Prior Publication Data
US 2011/0232093 A1 Sep. 29, 2011

Related U.S. Application Data

(62) Division of application No. 11/629,910, filed as application No. PCT/JP2005/015952 on Aug. 31, 2005.

(30) Foreign Application Priority Data

Sep. 8, 2004 (JP) .................. 2004-261446
Sep. 8, 2004 (JP) .................. 2004-261452

(51) Int. Cl.
*B21D 53/10* (2006.01)
*B24B 7/16* (2006.01)
(Continued)

(52) U.S. Cl.
CPC . *B24B 7/162* (2013.01); *B24B 5/18* (2013.01); *F16C 17/107* (2013.01); *F16C 33/107* (2013.01); *F16C 2370/12* (2013.01)

(58) Field of Classification Search
CPC ............ F16C 2220/60; F16C 2220/62; F16C 2220/70; F16C 32/127; F16C 33/34; F16C 33/36; F16C 17/02; F16C 33/74; F16C 33/741; F16C 33/1025; F16C 33/1065; F16C 33/107

USPC ............... 29/898.02, 895, 895.3, 895.33; 451/332, 268, 269, 49, 260, 261, 262, 451/278

See application file for complete search history.

(56) References Cited

U.S. PATENT DOCUMENTS 2,696,729 A * 12/1954 Vander Heyden ........... 52/223.7
(Continued)

FOREIGN PATENT DOCUMENTS

JP 63-280914 11/1988
JP 06-158357 6/1994
(Continued)

OTHER PUBLICATIONS

International Preliminary Report on Patentability and Written Opinion of the International Searching Authority issued Mar. 20, 2007 in International (PCT) Application No. PCT/JP2005/015952.
(Continued)

*Primary Examiner* — Christopher Besler
(74) *Attorney, Agent, or Firm* — Wenderoth, Lind & Ponack, L.L.P.

(57) ABSTRACT

A shaft material integrally having a shaft portion and a flange portion is formed by a forging process. The end face of the shaft portion of the shaft material and the end face of the flange portion on the opposite side of the shaft portion are ground relative to the corrected face, and the outer circumferential surface of the shaft material is ground relative to the end faces. This renders the cylindricity of the radial bearing faces formed on the outer periphery of the shaft portion of the produced shaft member to be 3 µm or lower. Moreover, a shaft material integrally having the shaft portion and flange portion is formed, while simultaneously thrust hydrodynamic groove regions are formed on both end faces of the flange portion. After the forging process, radial hydrodynamic groove regions are formed on the outer circumferential surface of the shaft portion.

4 Claims, 11 Drawing Sheets

(51) Int. Cl.
*B24B 5/18* (2006.01)
*F16C 17/10* (2006.01)
*F16C 33/10* (2006.01)

(56) References Cited

U.S. PATENT DOCUMENTS

| | | | |
|---|---|---|---|
| 5,769,544 | A | 6/1998 | Suzuki et al. |
| 6,108,909 | A * | 8/2000 | Cheever et al. ............ 29/898.02 |
| 6,390,681 | B1 | 5/2002 | Nakazeki et al. |
| 6,554,475 | B2 | 4/2003 | Yamada |
| 6,638,150 | B2 * | 10/2003 | Walczak et al. ................ 451/65 |
| 6,659,647 | B2 | 12/2003 | Sugiyama et al. |
| 2001/0022869 | A1 | 9/2001 | Tanaka et al. |
| 2002/0064234 | A1 | 5/2002 | Kaku et al. |
| 2003/0213128 | A1 | 11/2003 | Kaimi et al. |
| 2004/0035002 | A1 * | 2/2004 | Nishimura et al. ............. 29/895 |
| 2004/0161182 | A1 | 8/2004 | Kusaka et al. |

FOREIGN PATENT DOCUMENTS

| | | |
|---|---|---|
| JP | 7-27131 | 1/1995 |
| JP | 08-004753 | 1/1996 |
| JP | 08-196056 | 7/1996 |
| JP | 11-317004 | 11/1999 |
| JP | 2000-230557 | 8/2000 |
| JP | 2002-061641 | 2/2002 |
| JP | 2002-168240 | 6/2002 |
| JP | 2002-266865 | 9/2002 |
| JP | 2002-286028 | 10/2002 |
| JP | 2003-307221 | 10/2003 |
| JP | 2004-183867 | 7/2004 |

OTHER PUBLICATIONS

International Search Report issued Dec. 27, 2005 in corresponding International Application No. PCT/JP2005/015952.

* cited by examiner

US 9,003,664 B2

METHOD FOR PRODUCING SHAFT MEMBER FOR HYDRODYNAMIC BEARING APPARATUS

CROSS-REFERENCE TO RELATED APPLICATION

This application is a divisional of U.S. application Ser. No. 11/629,910, field Jun. 13, 2007, which is a National Stage application of PCT/JP05/15952, filed Aug. 31, 2005, the entireties of which are incorporated herein by reference.

BACKGROUND OF THE INVENTION

I. Technical Field

The present invention relates to a shaft member for hydrodynamic bearing apparatuses which relatively rotatably supports the shaft member in the radial direction in a non-contact manner by the hydrodynamic effect which occurs in a radial bearing gap, and a method for producing the same.

II. Description of Related Art

A hydrodynamic bearing rotatably supports a shaft member by the hydrodynamic effect of lubricating oil which occurs in a bearing gap in a non-contact manner. For example, the bearing is used in the spindle motor of disk-shaped recording medium drive units such as HDDs incorporated therein. Hydrodynamic bearing apparatuses of this type are provided with a radial bearing portion which rotatably supports a shaft member in the radial direction in a non-contact manner, and a thrust bearing portion which rotatably supports the shaft member in the thrust direction in a non-contact manner. Grooves for producing a hydrodynamic pressure (hydrodynamic grooves) are formed on the inner surface of a bearing sleeve or the outer surface of the shaft member, which constitutes the radial bearing portion. Moreover, hydrodynamic grooves are formed on both end faces of a flange portion of a shaft member which constitutes a thrust bearing portion, or on the face facing it (an end face of the bearing sleeve or an end face of a thrust member fixed on the housing, or the inner bottom face of the bottom of the housing, etc.) (for example, refer to Japanese Unexamined Patent Publication No. 2002-61641).

Moreover, the above hydrodynamic grooves are formed, for example, on the outer surface of the shaft member in a herringbone arrangement or a spiral arrangement. Known examples of methods for forming the hydrodynamic grooves of this type include cutting (for example, refer to Japanese Unexamined Patent Publication No. H08-196056), etching (for example, refer to Japanese Unexamined Patent Publication No. H06-158357), among others.

SUMMARY OF THE INVENTION

Recently, in order to deal with an increase in the information recording density and rotation speed of information appliances, there is a demand for higher rotational accuracy of spindle motors for the above information appliances. To meet this demand, higher rotational accuracy is required for hydrodynamic bearing apparatuses incorporated into the above spindle motor.

Moreover, to increase the rotational accuracy of hydrodynamic bearing apparatuses, it will be important to highly accurately control the accuracy of a radial bearing gap and thrust bearing gap, in which hydrodynamic pressure occurs. To control this gap appropriately, high dimensional accuracy is required for the shaft member of the hydrodynamic bearing apparatus relating to the formation of the bearing gaps mentioned above. In contrast, a further increase in accuracy by conventional processing methods is difficult since they suffer significantly from high processing costs. Therefore, the presentation of a new processing method of a shaft member is desired, which has both satisfactory processing accuracy and processing costs.

When hydrodynamic grooves are formed on the shaft member side (for example, on the outer surface of the shaft portion or both end faces of the flange portion), highly accurate processing of the hydrodynamic grooves is required since the processing accuracy of the hydrodynamic grooves affects the accuracy of the bearing gaps. However, to improve the processing accuracy of the hydrodynamic grooves by employing conventional processing methods (for example, etching, cutting, etc.), the processing costs significantly increase.

A first object of the present invention is to provide a shaft member for hydrodynamic bearing apparatuses having higher dimensional accuracy at low costs and a method for producing the same.

A second object of the present invention is to provide a shaft member for hydrodynamic bearing apparatuses having hydrodynamic grooves processed with high accuracy without a large increase in the processing costs and a method for producing the same.

To achieve the first object, the present invention provides a shaft member for hydrodynamic bearing apparatuses which comprises a shaft portion and a flange portion both formed by forging, and a radial bearing face facing a radial bearing gap and formed on the outer periphery of the shaft portion, and the radial bearing face having a cylindricity of 3 µm lower. Herein, the cylindricity is defined as follows: when a cylindrical face (the target face of the cylindricity. Herein, it refers to the radial bearing face of the shaft portion) is placed between two geometrically correct coaxial cylindrical faces, the cylindricity is represented by the difference between the radii of the two coaxial cylindrical faces in the case where the interval between the two coaxial cylindrical faces (inscribed cylindrical face and circumscribed cylindrical face) is rendered to a minimum. The radial bearing face can be any face facing the radial bearing gap which produces hydrodynamic effect, regardless of whether it has hydrodynamic grooves for producing a hydrodynamic effect.

The cylindricity of the radial bearing face formed on the outer periphery of the shaft portion considerably affects the accuracy, particularly of the radial bearing gap formed between the outer periphery of the shaft portion and the bearing component (bearing sleeve, housing, etc.) facing the outer periphery of the shaft portion. That is, if the value of the cylindricity becomes higher, the above radial bearing gap will not be constant in the circumferential direction or axial direction, making the difference between the widely gapped portions and narrowly gapped portions obvious. Accordingly, the rotational torque of the shaft member at the narrowly gapped bearing portions becomes higher than at other portions, which leads to increased bearing loss, while the stiffness of the bearing becomes lower at the above widely gapped bearing portions than at other portions, which leads greater runout of the shaft. Moreover, if the gap is not constant in the axial direction, an undesired flow of a lubricating fluid in the axial direction may occur and the appropriate circulation of the lubricating fluid may be adversely affected. From these perspectives, in the present invention, the cylindricity of the radial bearing face is defined to be 3 µm or lower. Accordingly, dimensional variation of the radial bearing gap in the circumferential direction or axial direction is suppressed, thereby suppressing the above bearing loss. This can also ensure the high stiffness of the bearing mentioned above. Therefore, the radial bearing gap between this shaft member and the bearing component facing the shaft member can be controlled with high accuracy to realize the high rotational accuracy of a bearing apparatus comprising the shaft member and bearing component.

In this shaft member, the perpendicularity of both end faces of the flange portion and the perpendicularity of an end face of the shaft portion, relative to the radial bearing face formed on the outer periphery of the shaft portion, are preferably 5 μm or lower, respectively. Herein, the term "perpendicularity" is defined as follows: in the combination of a predetermined plane and a reference plane which should be perpendicular to each other, the perpendicularity is represented by the maximum value of the difference between the predetermined plane (an end face of the flange portion or an end face of the shaft portion herein) and a geometric plane which is geometrically perpendicular relative to the reference plane (the radial bearing face herein). When the value of the perpendicularity of the end face of the flange portion is higher than 5 μm, a variation is generated in a thrust bearing gap formed between the end face and that facing it, which may adversely affect the bearing performance including an increased bearing loss. Moreover, when the value of the perpendicularity of the end face of the shaft portion is higher than 5 μm, it will be difficult to set the thrust bearing gap accurately, or when the end face of the shaft portion serves as the reference plane for grinding the outer surface of the shaft portion and the end face of the flange portion, the processing accuracy of these grinding surfaces may be lowered.

The above shaft member is formed of the shaft portion and flange portion respectively by forging. Using both end faces of the shaft member (an end face of the shaft portion and an end face of the flange portion located on both end faces of the shaft member) as the grinding surfaces enables to perform precise grinding of the outer surface of the shaft member using these faces as the reference planes. Accordingly, the shaft member having the radial bearing faces whose values of cylindricity and perpendicularity are suppressed can be obtained at low costs. The shaft portion and flange portion of the above shaft member can be also integrally formed by forging for further cost reduction.

Forming a slanting recess portion at the corner of the shaft portion and flange portion can ensure the undercut of the grind stone in grinding both the outer surface of the shaft portion and the end face of the flange portion. Although various methods can be usable as a method for forming this recess portion, forming by plastic processing is preferred from the perspective of inhibiting the production of burrs, impurities, etc., after processing.

Moreover, to achieve the first object, the present invention provides a method for producing a shaft member for hydrodynamic bearing apparatuses which comprises a step of forming a shaft material having the shaft portion and flange portion integrally by forging; and a step of correcting the cylindricity of a part or the entire outer surface of the shaft portion. More preferably, the present invention provides a method for producing a shaft member for hydrodynamic bearing apparatuses, wherein a first grinding is performed on both end faces of the shaft material relative to the corrected face mentioned above, and a second grinding is then performed on at least the outer surface of the shaft material relative to the both end faces.

In the present invention, as stated above, the cylindricity of the outer surface of the shaft portion is corrected after roughly forming of the shaft member (shaft material) having the shaft portion and flange portion integrally by forging. Therefore, highly accurate grinding (width grinding) can be performed relative to the corrected face in the first grinding step described later.

For the correcting process of the cylindricity mentioned above, various plastic processing, for example, rolling with round dies, flat dies, etc., can be used, as well as drawing compound, ironing, sizing by pressing (clipping) of split-cavity molds or the like.

In the first grinding step, both end faces located at both ends of the shaft material in the axial direction, specifically an end face of the shaft portion and an end face of the flange portion are ground. At this time, since the end faces are ground relative to the outer circumferential surface of the shaft portion which has been subjected to the correcting process as mentioned above, these two end faces of the shaft material can be finished with highly accurate perpendicularity and flatness.

The second grinding is then performed on the outer surface of the shaft material relative to these two ground end faces of the shaft material. Both end faces of the shaft material, which are the reference planes, have been highly accurately finished in the first grinding step. Hence, the target to be processed, i.e., the outer circumferential surface of the shaft material can also be finished highly accurately. The second grinding process is performed on at least a portion which will be the radial bearing face of the outer circumferential surface of the shaft material. Additionally, the process can also be performed on the outer circumferential surface of the flange portion. Furthermore, it can be performed on the other (on the shaft portion side) end face of the unground flange portion. In this second grinding step, these to-be-ground faces can be finished at a time by using grind stones (formed grind stone) having the outline shapes corresponding to these to-be-ground faces of the shaft material.

By following the above-mentioned procedure, the shaft member in which the radial bearing face has the cylindricity of 3 μm or lower and both end faces of the flange portion and the end face of the shaft portion have the perpendicularity of 5 μm or lower, respectively, can be produced at low costs.

The above shaft member for hydrodynamic bearing apparatuses can be provided as a hydrodynamic bearing apparatus which comprises a bearing sleeve into which the shaft member is inserted at its inner surface; a radial bearing portion which produces pressure by the hydrodynamic effect which occurs in a radial bearing gap between the outer periphery of the shaft portion and the inner periphery of the bearing sleeve to support the shaft portion in the radial direction in a non-contact manner; a first thrust bearing portion which produces pressure by the hydrodynamic effect of a fluid which occurs in a thrust bearing gap on one end side of the flange portion to support the flange portion in the thrust direction in a non-contact manner; and a second thrust bearing portion which produces pressure by the hydrodynamic effect of the fluid occurring in the thrust bearing gap on the other end side of the flange portion to support the flange portion in the thrust direction in a non-contact manner.

In this case, for example, hydrodynamic grooves for producing the hydrodynamic effect of the fluid can be formed asymmetrically in the axial direction on one of the outer circumferential surface of the shaft portion facing the radial bearing gap and the inner periphery face of the bearing sleeve opposing this outer circumferential surface.

The above hydrodynamic bearing apparatus can be provided as a motor which comprises a hydrodynamic bearing apparatus, a rotor magnet and a stator coil.

To achieve the second object, the present invention provides a shaft member for hydrodynamic bearing apparatuses which is a metallic shaft member for hydrodynamic bearing apparatuses which integrally comprises the shaft portion and the flange portion, in which a radial hydrodynamic groove region comprising the hydrodynamic grooves and demarcation portions demarcating each hydrodynamic groove is formed by plastic processing on the outer periphery of the shaft portion, and the outer circumferential surfaces of the demarcation portions in the radial hydrodynamic groove region are grinding surfaces. The demarcation portions herein refer to the portions which demarcate the hydrodynamic grooves, including the so-called ridges between the hydrodynamic grooves. Moreover, when the hydrodynamic grooves are formed with a slant arrangement in the axial direction, so-called smooth portions which divide those slanting hydrodynamic grooves in the axial direction are also included in the demarcation portions.

In the present invention, as stated above, the radial hydrodynamic groove region comprising the hydrodynamic grooves and demarcation portions demarcating each hydrodynamic groove is formed by plastic processing on the outer periphery of the shaft portion of the shaft member. Hence, for example, cutting powders are not produced unlike in cutting, thereby saving materials. Compared to processing methods by etching, the trouble of performing masking preliminarily for preventing of corrosion can be dispensed with, and processing costs can be thus greatly reduced on the whole. Moreover, the present invention is characterized in that the outer circumferential surfaces of the demarcation portions in the radial hydrodynamic groove region are grinding surfaces. These grinding surfaces are obtained by grinding the outer diameter portions of the demarcation portions (the top portions adjacent to the hydrodynamic grooves) demarcating the hydrodynamic grooves of the radial hydrodynamic groove regions formed by plastic processing. Accordingly, precise processing of the hydrodynamic groove region, which cannot be achieved only by plastic processing, is enabled, and the dimensional accuracy of the outer diameter and surface roughness can be accurately obtained. Therefore, according to the present invention, improved processing accuracy and reduced processing costs can be both achieved, such radial bearing gap in hydrodynamic bearing apparatuses can be controlled highly accurately.

Such a hydrodynamic groove region can be formed, for example, on both end faces of the flange portion formed integrally with the shaft portion by plastic processing. In this case, the flange portion is so constructed that thrust hydrodynamic groove regions comprising the hydrodynamic grooves and demarcation portions demarcating each hydrodynamic groove are formed on its both end faces and the end face in axial direction of the demarcation portions in these thrust hydrodynamic groove regions are grinding surfaces.

The radial hydrodynamic groove region can be formed, for example, by a rolling process or a forging process. Alternatively, both the radial hydrodynamic groove region and thrust hydrodynamic groove region can be formed by a forging process. Alternatively, the shaft portion and flange portion, in which these hydrodynamic groove regions are formed, respectively, can be formed, for example, integrally by forging.

To achieve the second object, the present invention also provides a method for producing a shaft member for hydrodynamic bearing apparatuses which comprises a shaft portion and a flange portion integrally, and a radial hydrodynamic groove region comprising hydrodynamic grooves and demarcation portions demarcating each hydrodynamic groove on the outer periphery of the shaft portion, the method comprising forming a radial hydrodynamic groove region by plastic processing on the outer periphery of the shaft portion of the shaft material, and then grinding a portion including an outer diameter portion of the demarcation portion in the radial hydrodynamic groove region.

According to such a producing method, both an improvement in the processing accuracy of the radial hydrodynamic groove region and reduction of the processing costs can be achieved. Moreover, forming the shaft material which integrally has the shaft portion and the flange portion by forging can realize further reduction of processing costs, or reduction of the cycle time per product.

Examples of the plastic processing of the radial hydrodynamic groove region employed include a forging process. In this case, both the shaft material and radial hydrodynamic groove region can be formed by forging, and forging of them can be performed simultaneously. Accordingly, such a processing step can be simplified and the cycle time required for processing can be even reduced.

In the shaft portion of the shaft material, it is possible to perform a rolling process for correcting the cylindricity of a portion including the radial hydrodynamic groove region of the shaft portion. In this case, for example, both the formation of the radial hydrodynamic groove region and the correction of the cylindricity of a portion including the radial hydrodynamic groove region of the shaft portion can be performed by rolling simultaneously so that such a processing step can be simplified and the cycle time can be shortened. Thus, the mass productivity of the product can be dramatically improved.

Alternatively, it is possible to perform forming the shaft material and forming the thrust hydrodynamic groove region comprising the hydrodynamic grooves and demarcation portions demarcating each hydrodynamic groove on both end faces of the flange portion both by forging, and to simultaneously perform forging of both. Accordingly, the processing steps relating to the formation of the shaft material and thrust hydrodynamic groove region can be simplified to shorten the machining time.

The above shaft member for hydrodynamic bearing apparatuses can be presented, for example, as a hydrodynamic bearing apparatus which comprises a shaft member for hydrodynamic bearing apparatuses; and a sleeve member into which this shaft member is inserted at its inner surface and which forms a radial bearing gap between itself and the shaft member, which retains the shaft member and sleeve member in a non-contact manner by the hydrodynamic effect of a fluid occurring in the radial bearing gap. The bearing sleeve can be formed, for example, from an oil-containing sintered metal, and a thrust hydrodynamic groove region can be formed on an end face in the axial direction of the sleeve instead of the end face of the flange portion.

The above hydrodynamic bearing apparatus can be provided as a motor comprising this hydrodynamic bearing apparatus, a rotor magnet and a stator coil.

According to the present invention, the outer circumferential surface of the shaft portion and the end face of the flange portion of the shaft member involved in the formation of the radial bearing gap and thrust bearing gap can be processed highly accurately at low costs. Therefore, these bearing gaps of the hydrodynamic bearing apparatus incorporating the shaft member can be controlled highly accurately. As a result, high rotational accuracy can be imparted to the above hydrodynamic bearing apparatus.

Moreover, according to the present invention, the hydrodynamic grooves formed on the shaft member can be processed accurately without an increase in such processing costs. Moreover, the bearing performance of the hydrodynamic bearing apparatus integrating this shaft member can be exerted stably for a long term by controlling the bearing gap in the hydrodynamic bearing apparatus highly accurately.

DETAILED DESCRIPTION OF THE INVENTION

A first embodiment of the present invention will be described below with reference to FIGS. 1-12.

Figure 2:
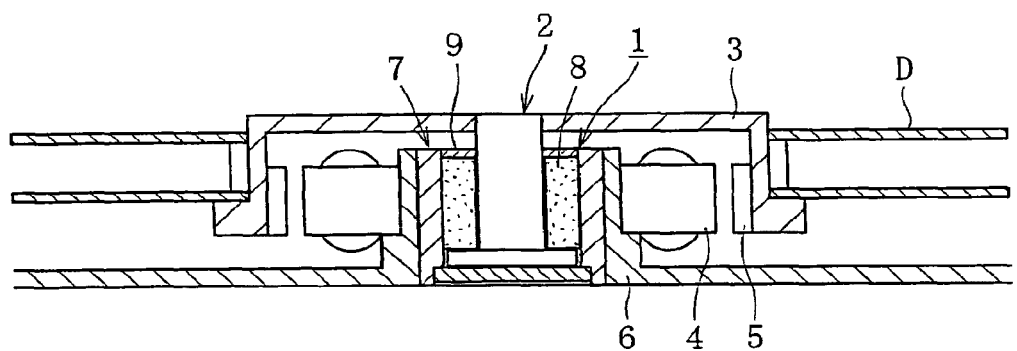
FIG. 2 is a cross-sectional view of a spindle motor for an information appliance integrating a hydrodynamic bearing apparatus comprising a shaft member.

FIG. 2 conceptionally shows a constitutional example of a spindle motor for an information appliance incorporating a hydrodynamic bearing apparatus 1 according to the first embodiment of the present invention. This spindle motor for an information appliance is used for disk drive units such as HDDs, and comprises the hydrodynamic bearing apparatus 1 which rotatably supports a shaft member 2 in a non-contact manner, a disk hub 3 which is mounted on the shaft member 2, for example, a stator coil 4 and a rotor magnet 5 facing each other across a gap in the radial direction, and a bracket 6. The stator coil 4 is mounted on the outer periphery of the bracket 6, and the rotor magnet 5 is mounted on the inner periphery of the disk hub 3. The bracket 6 has the hydrodynamic bearing apparatus 1 mounted on its inner periphery. Moreover, the disk hub 3 retains one or more disks D such as magnetic disks on its outer periphery. In this spindle motor for an information appliance, when the stator coil 4 is energized, the rotor magnet 5 is rotated by the excitation between the stator coil 4 and rotor magnet 5, whereby the disk hub 3 and the disk D retained by the disk hub 3 is rotated unitarily with the shaft member 2.

Figure 3:
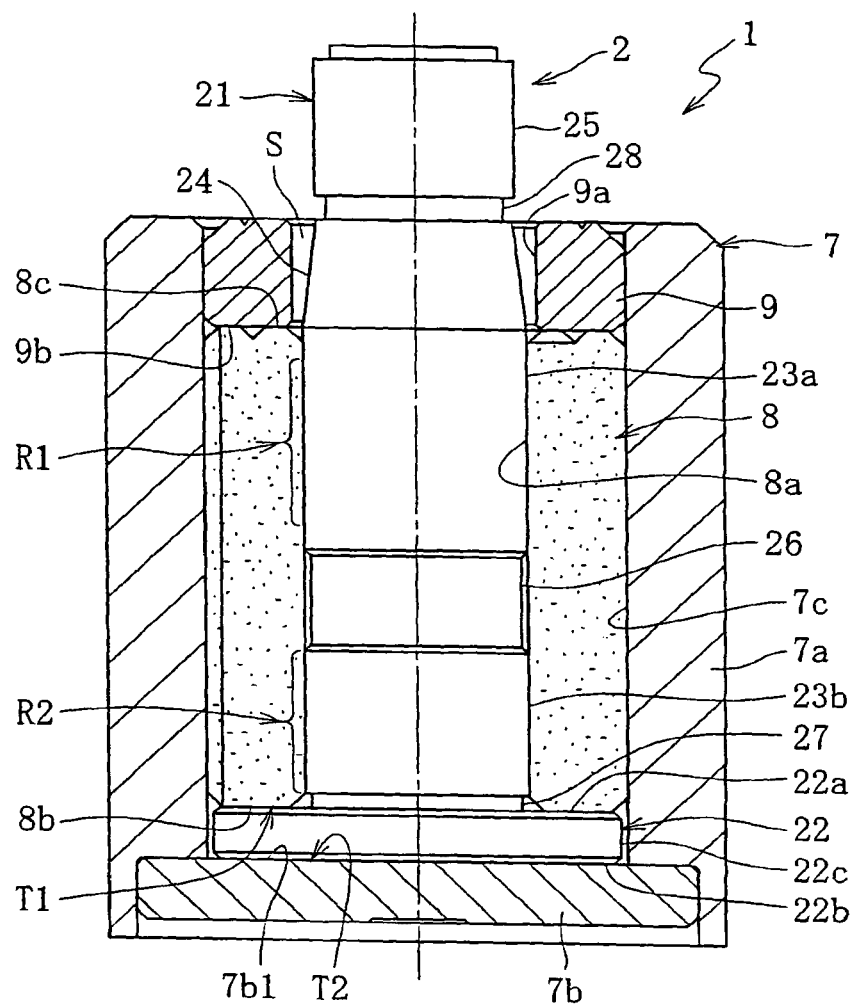
FIG. 3 is a longitudinal sectional view of a hydrodynamic bearing apparatus.

FIG. 3 shows the hydrodynamic bearing apparatus 1. This hydrodynamic bearing apparatus 1 is mainly constituted of a housing 7 having a bottom 7b at its one end, a bearing sleeve 8 fixed on the housing 7, and a shaft member 2 inserted at the inner periphery of the bearing sleeve 8. For the sake of explanation, the bottom 7b side of the housing 7 is referred to as the lower side, and the side opposite to the bottom 7b is referred to as the upper side in the following description.

As shown in FIG. 3, the housing 7 is constituted of, for example, a side portion 7a formed of a resin material such as LCP, PPS and PEEK in the form of a cylinder, and a bottom 7b located at one end side of the side portion 7a and, for example, formed of a metallic material. In this embodiment, the bottom 7b is formed separately from the side portion 7a, is retrofitted on the lower inner periphery of the side portion 7a. In a part of the annular region os the upper end face 7b1 of the bottom 7b, hydrodynamic grooves are formed, for example, in the form of a spiral, as a portion for producing hydrodynamic pressure, although not shown in the Figs. In this embodiment, the bottom 7b is formed separately from the side portion 7a, and is fixed on the lower inner periphery of the side portion 7a. It can be, however, formed integrally with the side portion 7a, for example, from a resin material. At this time, the hydrodynamic grooves provided on the upper end face 7b1 can be molded simultaneously with the injection molding of the housing 7 comprising the side portion 7a and bottom 7b, which can dispense with the trouble of forming the hydrodynamic grooves on the bottom 7b.

The bearing sleeve 8 is formed of, for example, a porous body made of a sintered metal, especially a porous body of a sintered metal comprising copper as a main ingredient in the form of a cylinder, and is fixed at a predetermined position on an inner surface 7c of the housing 7.

Figure 4:
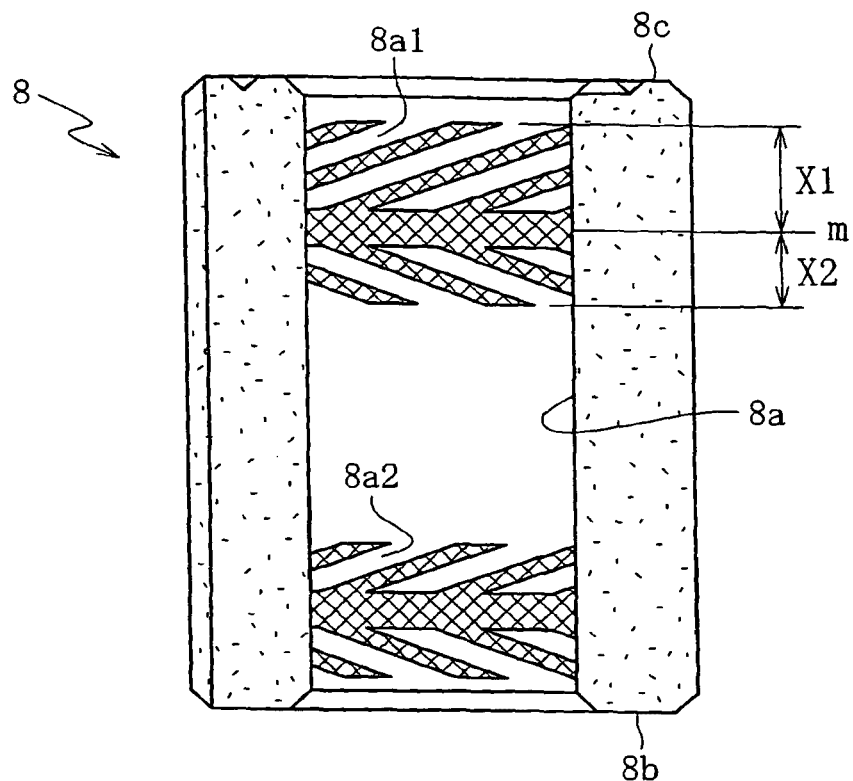
FIG. 4 is a longitudinal sectional view of a bearing sleeve.

Throughout an inner surface 8a of the bearing sleeve 8 or in a part of its cylindrical face region, a radial hydrodynamic pressure producing part is formed. In this embodiment, for example, as shown in FIG. 4, a region, in which a plurality of hydrodynamic grooves 8a1, 8a2 are arranged in a herringbone shape, is formed at two axially separated positions. The upper hydrodynamic groove 8a1 is formed asymmetrically in the axial direction relative to the axial center m (the axial center of the region between the upper and lower slanted grooves), the axial dimension X1 of the region above the center m in the axial direction is larger than the axial dimension X2 of the region therebelow.

Although not shown in the Figs., for example, a region in which a plurality of hydrodynamic grooves are arranged spirally is formed throughout the lower end face 8b of the bearing sleeve 8 or in a part of annular region, as a portion for producing thrust hydrodynamic pressure.

A sealing member 9 as a sealing means is formed of, for example, a soft metallic material such as brass and other metallic materials, or a resin material in a ring shape, as shown in FIG. 3. The sealing member 9 is press-fitted to the upper inner periphery of the side portion 7a of the housing 7, and is fixed by means of adhesion or the like. In this embodiment, the inner surface 9a of the sealing member 9 is formed in the shape of a cylinder, and the lower end face 9b of the sealing member 9 is in contact with the upper end face 8C of the bearing sleeve 8.

Figure 1:
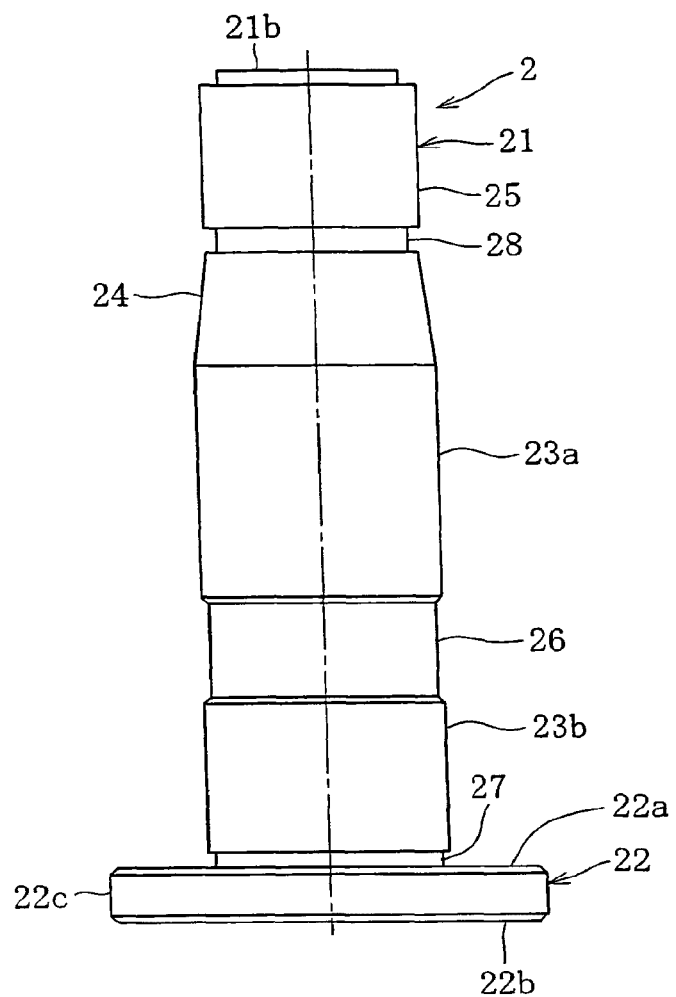
FIG. 1 is a side elevational view of a shaft member for the hydrodynamic bearing apparatus according to the first embodiment of the present invention.

As shown in FIG. 1, the shaft member 2 is formed of a metallic material such as stainless steel, and has a T-shaped cross section integrally comprising a shaft portion 21 and a flange portion 22 provided at the lower end of the shaft portion 21. On the outer periphery of the shaft portion 21, as shown in FIG. 3, radial bearing faces 23a, 23b facing the formation region of two hydrodynamic grooves 8a1, 8a2 formed on the inner surface 8a of the bearing sleeve 8 are formed at two axially separated positions. Above one of the radial bearing faces, the face 23a and a tapered face 24 whose diameter gradually decreases toward the shaft tip are formed adjacently. Further thereabove, a cylinder face 25, which serves as a mounting portion of the disk hub 3, is formed. Annular recess portions 26, 27, 28 are formed between the two radial bearing faces 23a, 23b, between the other radial bearing face 23b and flange portion 22, and between the tapered face 24 and cylinder face 25, respectively.

On both end faces of the flange portion 22, thrust bearing faces 22a, 22b facing the hydrodynamic groove regions formed on the lower end face 8b of the bearing sleeve and the upper end face 7b1 of the bottom 7b, respectively, are formed.

Between the tapered face 24 of the shaft portion 21 and the inner surface 9a of the sealing member 9 facing the tapered face 24, an annular sealing space S, whose radial dimension gradually increases upwardly from the bottom 7b side of the housing 7, is formed. In the hydrodynamic bearing apparatus 1 after being assembled (refer to FIG. 3), the oil level is within the range of the sealing space S.

In the thus constructed hydrodynamic bearing apparatus 1, when the shaft member 2 is rotated, the pressure of a lubricating oil film formed in the radial bearing gap between the formation regions (two positions: upper and lower) of the hydrodynamic grooves 8a1, 8a2 of the inner periphery of the bearing sleeve 8 and the radial bearing faces 23a, 23b of the shaft portion 21 facing these regions, respectively, is increased by the hydrodynamic effect of the hydrodynamic grooves 8a1, 8a2. A first radial bearing portion R1 and a second radial bearing portion R2 which rotatably support the shaft member 2 in the radial direction in a non-contact manner by the pressure of these oil films are then formed. The pressures of a first thrust bearing gap between the hydrodynamic groove region formed on the lower end face 8b of the bearing sleeve 8 and the thrust bearing face 22a of the upper side (the shaft portion side) of the flange portion 22 facing this hydrodynamic groove region and a lubricating oil film formed on a second thrust bearing gap between the hydrodynamic groove region formed on the upper end face 7b1 of the bottom 7b and the thrust bearing face 22b of the lower side (opposite to the shaft portion side) of the flange portion 22 facing this face are increased by the hydrodynamic effect of the hydrodynamic grooves. A first thrust bearing portion T1 and a second thrust bearing portion T2 which rotatably support the shaft member 2 in the thrust direction in a non-contact manner by the pressures of these oil films are then formed.

The method for producing the shaft member 2 constituting the above hydrodynamic bearing apparatus 1 will be described below.

The shaft member 2 is produced in mainly two steps: (A) forming step and (B) grinding step. In this embodiment, one of these steps, the (A) forming step includes a forging process (A-1) and a correcting process (A-2), and the (B) grinding step includes width grinding (B-1), full-face grinding (B-2) and finish grinding (B-3).

(A) Forming Step (A-1) Forging Process

Figure 5:
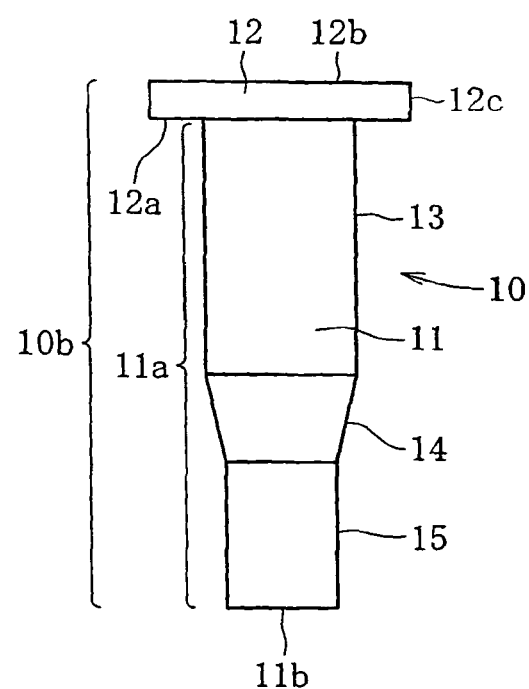
FIG. 5 is a side elevational view of a shaft material formed by a forging process.

To begin with, a bar material made of metal such as stainless steel which is a material of the shaft member 2 to be formed is cold-forged to form the shaft material 10 having a T-shaped cross section and integrally having the shaft portion 11 and flange portion 12, as shown in FIG. 5. The cold-forging method used may be any of extrusion, upsetting, heading or the like, or combinations of them. In the examples shown in FIG. 5, the outer circumferential surface 11a of the shaft portion 11 after being subjected to the forging process has such a different diameter shape that the tapered face 14 is disposed therebetween, but may be formed to have a uniform diameter throughout its length by dispensing with the tapered face 14.

As mentioned above, forming the shaft material 10 by forging does not produce cutting allowance and can reduce wasted materials compared with forming the shaft material 10 having a similar shape by, for example, cutting or the like. Moreover, since it is a pressing operation, the cycle time per piece of the shaft material 10 can be improved, thereby improving the productivity.

(A-2) Correcting Process

Figure 6:
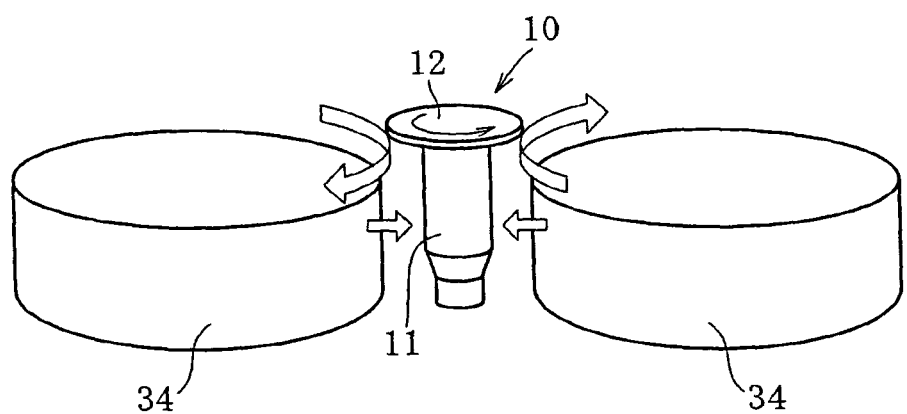
FIG. 6 is a schematic illustration of a correcting process (rolling process) by round dies.
Figure 7:
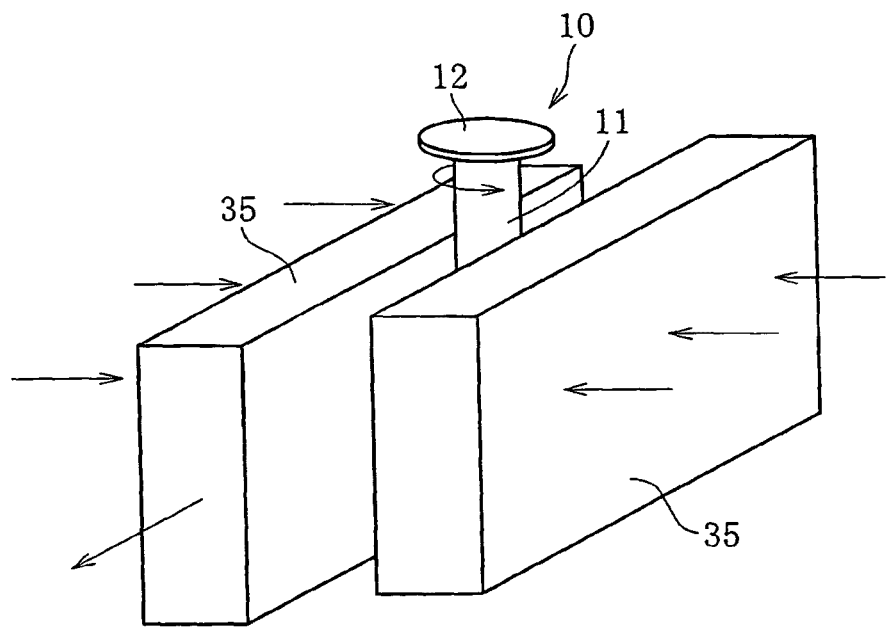
FIG. 7 is a schematic illustration of a correcting process (rolling process) by flat dies.

Subsequently, the outer circumferential surface 11a of the shaft portion of the shaft material 10 after being subjected to the forging process is subjected to a plastic processing for correcting the cylindricity. This improves the cylindricity of the face 13 subjected to the correcting process, of the outer circumferential surface of the shaft portion 11a of the shaft material 10 so that it falls within a required range (for example, 10 μm or lower). At this time, the correcting process of the cylindricity employed may be, for example, a rolling process by using round dies 34, flat dies 35, etc., as shown in FIG. 6 or FIG. 7. Various other processing methods such as drawing, ironing, sizing process by pressing (clipping) split-cavity molds, etc., can be employed. The correcting process is conducted throughout the length of the outer circumferential surface of the shaft portion 11, or can be conducted on a part thereof. When only a part thereof is corrected, its processed region includes at least the region which will be the radial bearing faces 23a, 23b of the shaft member 2.

(B) Grinding Step (B-1) Width Grinding Process

The end face 11b of the shaft portion and the end face 12b of the flange portion 12 on the opposite side of the shaft portion (refer to FIG. 5), which will be the end faces of the shaft material 10 subjected to the correcting process, is ground relative to the corrected face 13 mentioned above of the outer circumferential surface of the shaft portion 11a (first grinding step). A grinding apparatus 40 used in this grinding step comprises, for example, a carrier 41 which retains a plurality of the shaft material 10 as workpieces, and a pair of grind stones 42, 42 which grinds the end face 11b of the shaft portion of the shaft material 10 retained by the carrier 41 and the end face 12b of the flange portion 12 on the side opposite to the shaft portion, as shown in FIG. 8.

Figure 8:
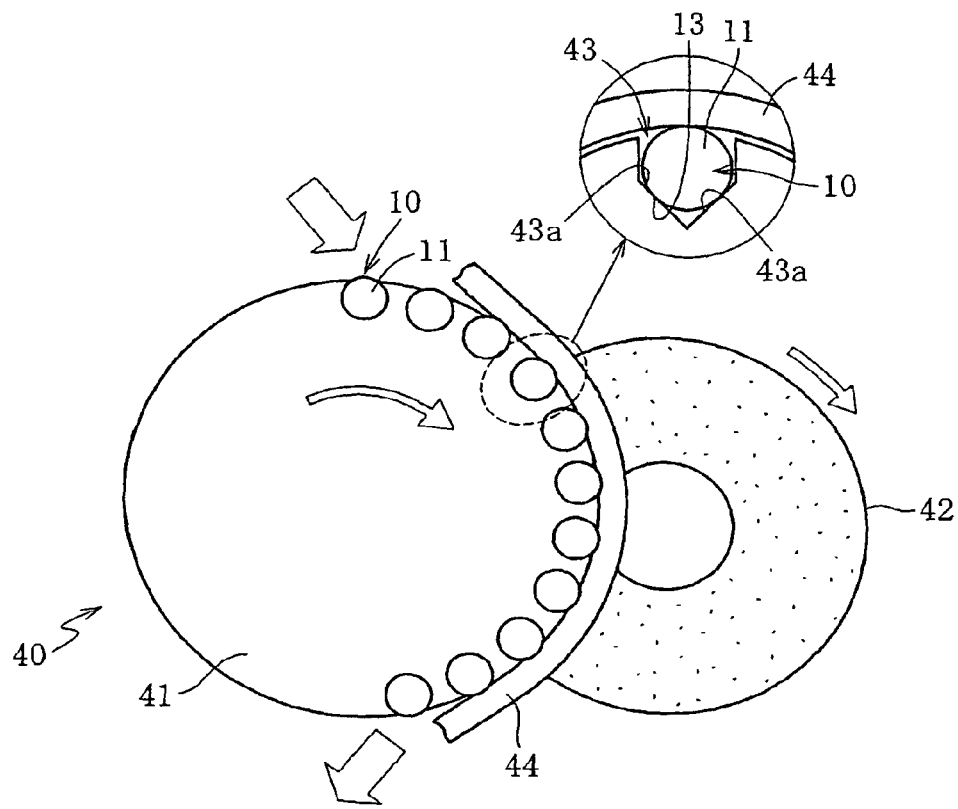
FIG. 8 is a schematic illustration showing an example a grinding apparatus according to the width grinding step of a shaft material.

As shown in FIG. 8, a plurality of notches 43 is provided on a part of the circumferential region of the outer circumferential edge of the carrier 41 at an equal pitch in the circumferential direction. The shaft material 10 is contained in the notch 43 with its correcting process face 13 in angular contact with the inner face 43a of the notch 43. The correcting process face 13 of the shaft material 10 protrudes slightly from the outer circumferential surface of the carrier 41, and on the outer diameter side of the carrier, a belt 44 is provided in a tensioned state to bind the protruding portions of the shaft material 10 from the outer diameter side. On both end sides of the carrier 41 of the shaft material 10 contained in the notch 43 in the axial direction, a pair of grind stones 42, 42 are coaxially disposed with their end faces (grinding surfaces) facing each other at a predetermined interval.

As the carrier 41 rotates, the shaft material 10 is sequentially loaded into the notch 43 from a determined position. The loaded material 10 traverses the end faces of the rotating grind stones 42, 42 from their outer diameter edge toward the inside diameter edge, while being prevented from falling off from the notch 43 by binding of the belt 44. Accordingly, both end faces of the shaft material 10, i.e., the end face 11*b* of the shaft portion and the end face 12*b* of the flange portion 12 on the side opposite to the shaft portion are ground by the end faces of the grind stones 42, 42. At this time, since the corrected face 13 of the shaft material 10 is supported by the carrier 41 and this corrected face 13 has high cylindricity. Therefore, if the perpendicularity of the rotation axis of the grind stone 42 and the grinding surface of the grind stone 42 and the parallelism of the rotation axis of the grind stone 42 and the rotation axis of the carrier 41, etc., are controlled in advance with highly accuracy, relative to this corrected face 13, the above-mentioned both end faces 11*b*, 12*b* of the shaft material 10 can be finished with high accuracy, enabling to suppress the value of the perpendicularity relative to the corrected face 13. Moreover, the width of the shaft material 10 in the axial direction (the overall length including the flange portion 12) can be finished to have a predetermined size.

(B-2) Full-Face Grinding Process

Figure 10:
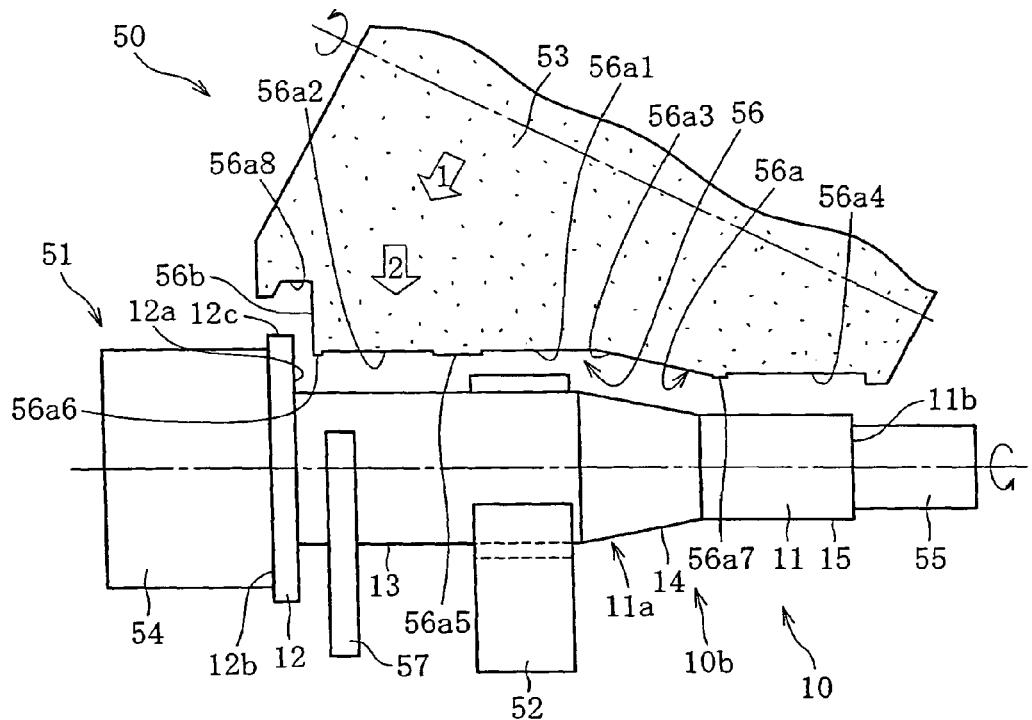
FIG. 10 is a schematic illustration showing an example of a grinding apparatus according to the full-face grinding step of a shaft material.
Figure 11:
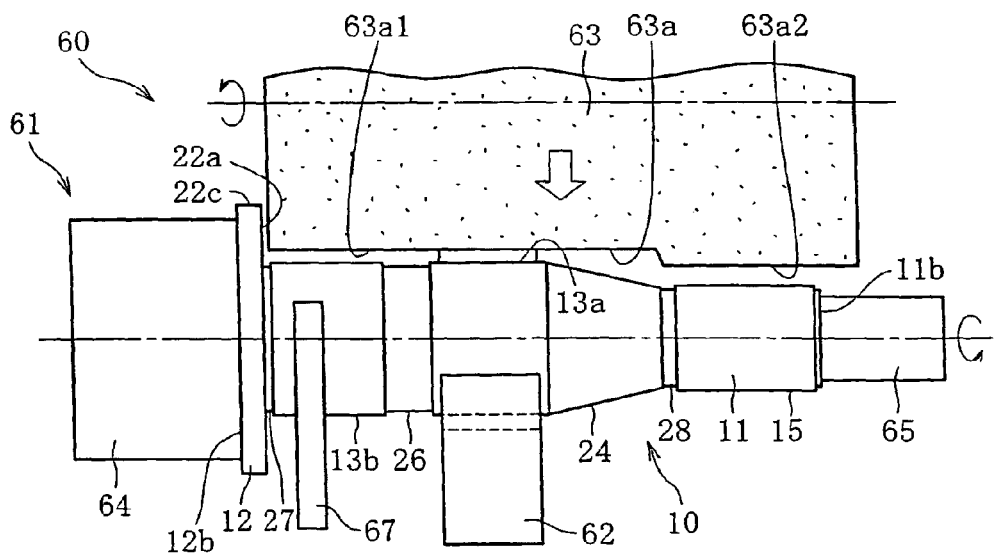
FIG. 11 is a schematic illustration showing an example of a grinding apparatus according to the grinding finishing step of a shaft material.

Subsequently, the outer circumferential surface 10*b* of the shaft material 10 and the end face 12*a* on the shaft portion side of the flange portion 12 are ground relative to both end faces 11*b*, 12*b* of the ground shaft material (second grinding step). The grinding apparatus used in this grinding step is, for example, plunge-ground by the grind stone 53 with the back plate 54 and pressure plate 55 pressed against both end faces of the shaft material 10, as shown in FIG. 10. The corrected face 13 of the shaft material 10 is rotatably supported by a shoe 52.

The grind stone 53 is a formed grind stone which comprises a grinding surface 56 corresponding to the outer circumferential surface shape of the shaft member 2 as a finished product. The grinding surface 56 comprises a cylinder grinding portion 56*a* which grinds the outer circumferential surface 11*a* throughout the axial length of the shaft portion 11 and the outer circumferential surface 12*c* of the flange portion 12; and a plane grinding portion 56*b* which grinds the end face 12*a* on the shaft portion side of the flange portion 12. In the example shown in FIG. 10, the grind stone 53 comprises, as the cylinder grinding portion 56*a*, portions 56*a*1, 56*a*2, which grind the regions corresponding to the radial bearing faces 23*a*, 23*b* of the shaft member 2, a portion 56*a*3, which grinds the region corresponding to the tapered face 24, a portion 56*a*4, which grinds the region corresponding to the cylinder face 25, portions 56*a*5-56*a*7, which grind the recess portions 26-28, respectively, and a portion 56*a*8, which grinds the outer circumferential surface 12*c* of the flange portion 12.

Grinding in the grinding apparatus 50 of the above constitution is performed in the following procedure. To begin with, the grind stone 53 is fed in a diagonal direction (the direction of arrow 1 in FIG. 10) with the shaft material 10 and grind stone 53 rotating, and the plane grinding portion 56*b* of the grind stone 53 is pressed against the end face 12*a* on the shaft portion side of the flange portion of the shaft material 10, to mainly grind the end face 12*a* on the shaft portion side. This causes the end face 12*a* on the shaft portion side in the flange portion 22 of the shaft member 2 to be ground. Subsequently, the grind stone 53 is fed in the direction perpendicular to the rotation axis of the shaft material 10 (the direction of arrow 2 in FIG. 10), and the cylinder grinding portion 56*a* of the grind stone 53 is pressed against the outer circumferential surface 11*a* of the shaft portion 11 of the shaft material 10 and the outer circumferential surface 12*c* of the flange portion 12 to grind the faces 11*a*, 12*c*. Accordingly, out of the outer circumferential surface of the shaft portion 21 of the shaft member 2, the regions 13*a*, 13*b* corresponding to the radial bearing faces 23*a*, 23*b* of the shaft material 10, the tapered face 24 and the region 15 corresponding to the cylinder face 25, and the outer circumferential surface 22*c* of the flange portion 22 are ground, and the recess portions 26-28 are formed. Note that in the above grinding, for example, as shown in FIG. 10, it is preferable to perform grinding while measuring the remaining grinding allowance by a measurement gauge 57.

In this second grinding step, since the accuracy setting has been performed of the perpendicularity of both end faces 11*b*, 12*b* of the shaft material 10 beforehand in the width grinding, each of the to-be-ground surfaces can be ground highly accurately.

(B-3) Finish Grinding Process (B-2) Among the faces which have been ground in full-face grinding, the radial bearing faces 23*a*, 23*b* of the shaft member 2 and regions 13*s*, 13*b*, 15 corresponding to the cylinder face 25 are subjected to final finish grinding. A grinding apparatus used in this grinding, for example, performs plunge grinding by the grind stone 63, while rotating the shaft material 10 held between the back plate 64 and pressure plate 65 by the cylinder grinder shown in FIG. 11. The shaft material 10 is rotatably supported by a shoe 62. A grinding surface 63*a* of the grind stone 63 comprises the first cylinder grinding portion 63*a*1, which grinds the regions 13*a*, 13*b* corresponding to the radial bearing faces 23*a*, 23*b*, and the second cylinder grinding portion 63*a*2, which grinds the region 15 corresponding to the cylinder face 25.

In the thus constructed grinding apparatus 60, the rotating grind stone 63 is provided with the feed in the radial direction so that the radial bearing faces 23*a*, 23*b* and the regions 13*a*, 13*b*, 15 corresponding to the cylinder face 25 are ground respectively and these regions are finished with a final surface accuracy. In this embodiment, the regions corresponding to the radial bearing face 23*a*, 23*b* and the region corresponding to the cylinder face 25 are both subjected to finish grinding, the grinding of the region corresponding to the cylinder face 25 may be dispensed with.

After performing the (A) forming step and (B) grinding step discussed the above, heat treatment and cleaning process, if necessary, can be performed to complete the shaft member 2 shown in FIG. 1.

The shaft member 2, as long as it is produced by the production method mentioned above, can be finished to have the cylindricity of the radial bearing faces 23*a*, 23*b* formed on the outer periphery of the shaft portion 21 of, for example, 3 μm or lower (desirably 1.5 μm or lower). This allows, for example, variation in the radial bearing gap formed between itself and the inner periphery of the bearing sleeve 8 of in the hydrodynamic bearing apparatus 1 in the circumferential direction or axial direction to fall within a predetermined range, preventing bearing performance from being adversely affected by the variation of the above radial bearing gap. Therefore, such a radial bearing gap can be controlled with high accuracy, and the rotational accuracy of hydrodynamic bearing apparatuses of this type can be maintained at a high level. Note that in this embodiment, not only the radial bearing face 23a, 23b but also the region corresponding to the cylinder face 25 are subjected to finish grinding (refer to FIG. 11), the cylinder face 25 is also finished to have the above cylindricity. Therefore, the mounting accuracy (perpendicularity, etc.) of mounting components such as the disk hub 3 on the shaft member 2 is increased, contributing to the improvement in the motor performance.

It is possible to form the shaft member 2 in which the perpendicularity of both end faces of the flange portion 22 (thrust bearing faces) 22a, 22b and the perpendicularity of the end face 21b of the shaft portion are both 5 μm or lower, relative to the radial bearing faces 23a, 23b formed on the outer periphery of the shaft portion 21 according to the above production method. Among them, the thrust bearing faces 22a, 22b formed on both end faces of the flange portion 22 form the thrust bearing gap between the face opposing them (the lower end face 8b of the bearing sleeve 8 and the upper end face 7b1 of the bottom 7b of the housing 7, etc.) and themselves. Therefore, the numerical value of such perpendicularity can be thus suppressed to a low level, whereby variation in of the above thrust bearing gap can be reduced. Moreover, the end face 21b of the shaft portion serves not only as the reference plane for grinding the outer circumferential surface of the shaft portion 21 and the upper end face of the flange portion 22 (thrust bearing face 22a side), but also as the reference plane for setting the above thrust bearing gap. Accordingly, by suppressing the numerical value of the perpendicularity of the end face 21b of the shaft portion to a low level, and such a grinding face, as well as the thrust bearing gap, can be controlled highly accurately.

Note that in the above description, in the full-face grinding shown in FIG. 10, the cylinder grinding of the outer circumferential surface 10b of the shaft material 10 and the plane grinding of the end face 12a on the shaft portion side of the flange portion 12 are performed by the common grind stone 53, but both grinding may be performed by different grind stones.

Figure 12:
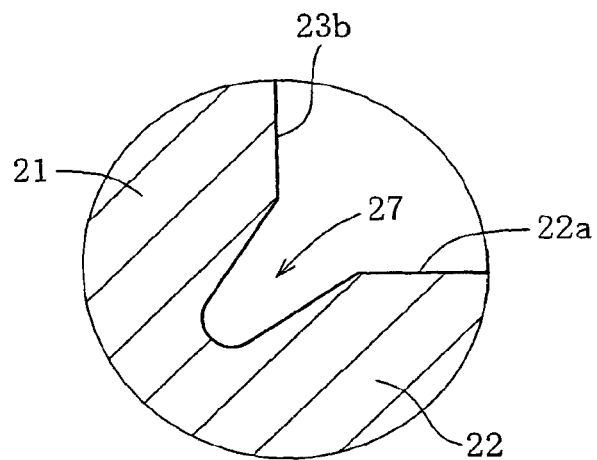
FIG. 12 is an expanded sectional view of the vicinity of the corner between the shaft portion and flange portion of a shaft member.

In the above description, the case where the recess portions 26-28 of the shaft member 2 are formed in the full-face grinding (B-2) shown in FIG. 10 was exemplified. However, these recess portions 26-28 may be subjected to the plastic processing (for example rolling) simultaneously in correcting process shown in FIGS. 6 and 7. In this case, in particular the recess portion 27 of the corner between the shaft portion 21 and flange portion 22 is formed obliquely as shown in FIG. 12. This allows the recess portion 27 to also serve as an undercut of the grind stone 53 for grinding the end face 12a on the shaft portion side of the flange portion 12 and the outer circumferential surface of the shaft portion 11a simultaneously in the full-face grinding (refer to FIG. 10).

In the embodiments described above, the case where the radial bearing faces 23a, 23b of the shaft member 2 and thrust bearing faces 22a, 22b are all smooth surfaces having no hydrodynamic grooves was exemplified, but hydrodynamic grooves may be formed on these bearing faces. In this case, the radial hydrodynamic grooves can be formed by rolling or forging, and the thrust hydrodynamic groove can be formed by pressing or forging, at the stage preceding the full-face grinding shown in FIG. 10.

A second embodiment of the present invention will be described below with reference to FIGS. 13-21. Note that the parts and components having the same constitution and action as the constitution (first embodiment) shown in FIGS. 1-12 are denoted by the identical reference numerals, and repeated explanations are omitted.

Figure 16:
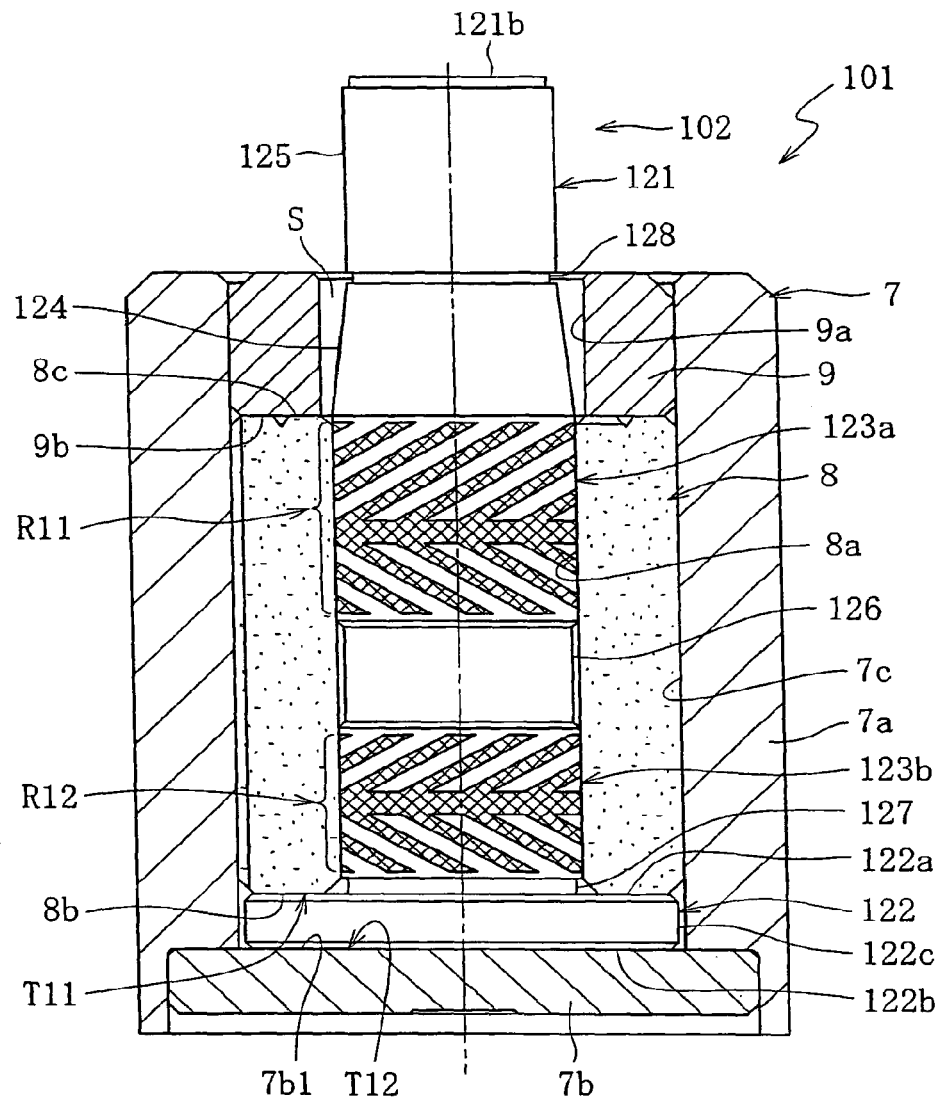
FIG. 16 is a longitudinal sectional view of a hydrodynamic bearing apparatus comprising a shaft member.

FIG. 16 shows a hydrodynamic bearing apparatus 101 according to the second embodiment of the present invention. This hydrodynamic bearing apparatus 101 is also used in a spindle motor for disk drive units shown in FIG. 2 incorporated therein, and constitutes a motor together with, for example, a disk hub 3, stator coil 4, rotor magnet 5 and bracket 6 shown in the same Figs (FIG. 2). The hydrodynamic bearing apparatus 101 comprises a housing 7 having a bottom 7b at its one end, a bearing sleeve 8 fixed on to the housing 7, a shaft member 102 inserted at the inner periphery of the bearing sleeve 8, and a sealing member 9 as its main components. Note that also in this embodiment, for the sake of explanation, the side of the bottom 7b of the housing 7 is referred to as the lower side, and the side opposite to the bottom 7b is referred to as the upper side in the description below.

Figure 13:
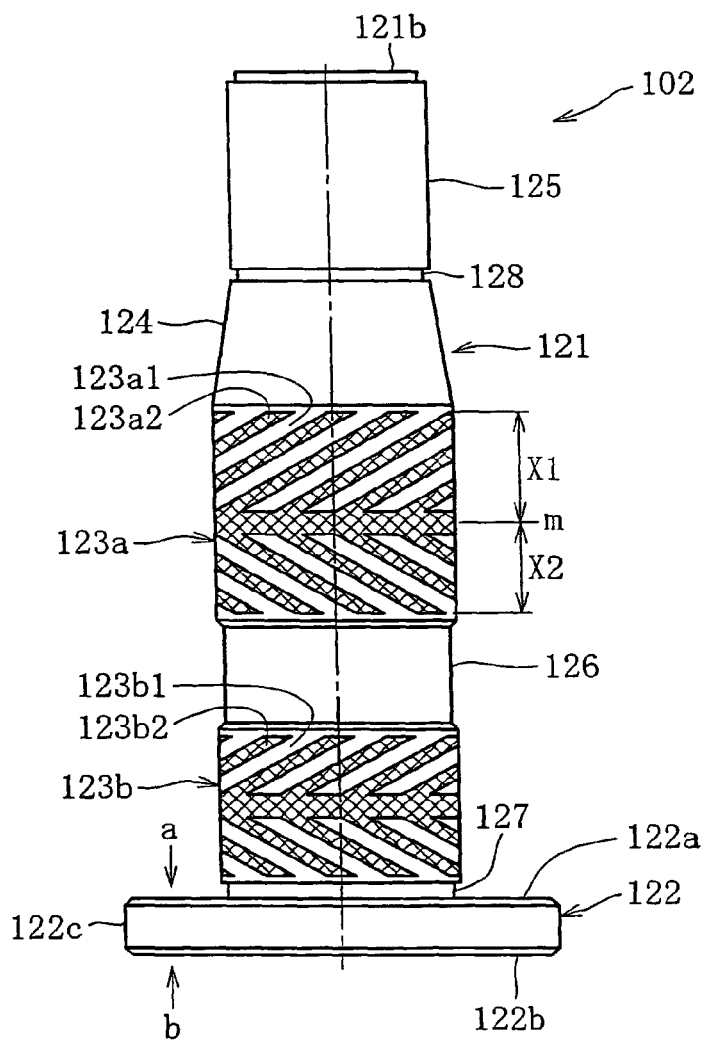
FIG. 13 is a side elevational view of a shaft member for a hydrodynamic bearing apparatus according to the second embodiment of the present invention.

As shown in FIG. 13, the shaft member 102 is formed of, for example, a metallic material such as stainless steel, and has a T-shaped cross section integrally comprising a shaft portion 121 and a flange portion 122 provided at the lower end of the shaft portion 121. In a part of the outer periphery of the shaft portion 121, a cylinder region, radial hydrodynamic groove regions 123a, 123b are formed at two axially separated positions. Accordingly, in this embodiment, an inner surface 8a of a bearing sleeve 8 facing the radial hydrodynamic groove regions 123a, 123b is a cylindrical face having no hydrodynamic grooves and having a circular cross section.

These two upper and lower hydrodynamic groove regions 123a, 123b comprise a plurality of hydrodynamic grooves 123a1, 123b1 and demarcation portions 123a2, 123b2 demarcating the hydrodynamic grooves 123a1, 123b1, respectively. In this embodiment, as shown in FIG. 1, they are both in a herringbone shape. Among them, the upper radial hydrodynamic groove region 123a is formed asymmetrically in the axial direction relative to the axial center m (the center in the axial direction of the region between the upper and lower slanted grooves), and the axial dimension X1 of the region above the axial center m is larger than the axial dimension X2 of the region therebelow.

Figure 14:
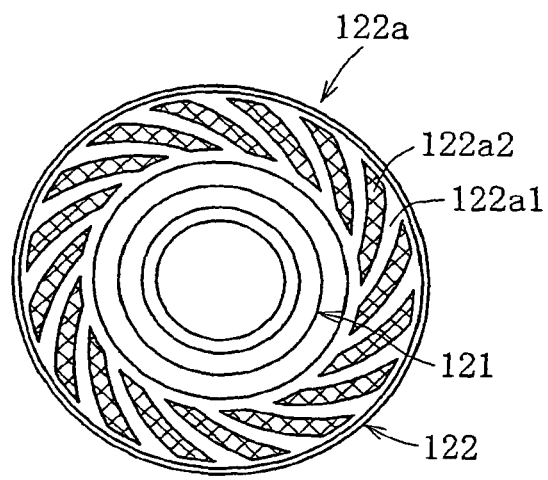
FIG. 14 is a top view of the flange portion of a shaft member seen from the direction of arrow A.
Figure 15:
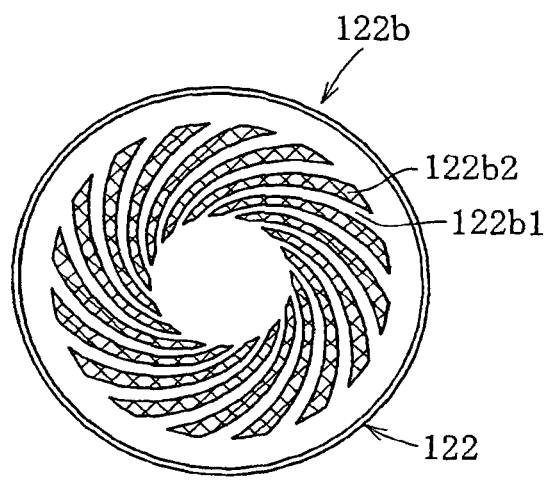
FIG. 15 is a bottom view of the flange portion of a shaft member seen from the direction of arrow B.

Throughout the upper end face of the flange portion 122 or in a part of its annular region, for example, as shown in FIG. 14, a thrust hydrodynamic groove region 122a is formed. Moreover, in a part of its annular region of the lower end face of the flange portion 122, for example, as shown in FIG. 15, a thrust hydrodynamic groove region 122b is formed. These thrust hydrodynamic groove regions 122a, 122b comprise respectively a plurality of hydrodynamic grooves 122a1, 122b1 and demarcation portions 122a2, 122b2 demarcating the hydrodynamic groove 122a1, 122b1. In this embodiment, as shown in FIGS. 14 and 15, each of the region forms a spiral shape. Note that the thrust hydrodynamic groove regions 122a, 122b may be in the shape, for example, of a herringbone shape or the like, without particularly being limited to the shape shown. Alternatively, each of the upper and lower faces may have different hydrodynamic groove shapes.

Above one of the hydrodynamic groove regions, the radial hydrodynamic groove region 123a, a tapered face 124, of which diameter gradually decreases toward the shaft tip, is formed adjacently, and a cylinder face 125, which will be a mounting portion of the disk hub 3, is formed further thereabove. Annular recess portions 126, 127, 128, are formed between the two radial hydrodynamic groove regions 123a, 123b, between the other radial hydrodynamic groove region 123b and the flange portion 122, and between the tapered face 124 and the cylinder face 125, respectively.

Between the tapered face 124 of the shaft portion 121 and the inner surface 9a of a sealing member 9 facing the tapered face 124, an annular sealing space S, whose size in the radial direction is gradually increased upwardly from the bottom 7b side of the housing 7 is formed. In the hydrodynamic bearing apparatus 1 after being assembled (refer to FIG. 16), the oil level is maintained within the range of the sealing space S.

In the thus constructed hydrodynamic bearing apparatus 101, when the shaft member 102 is rotated, the pressure of a lubricating oil film formed the radial bearing gap between a cylinder face 8a formed on the inner periphery of the bearing sleeve 8 and the radial hydrodynamic groove regions 123a, 123b of the shaft portion 121 facing the cylinder face 8a is increased by the hydrodynamic effect of the hydrodynamic grooves 123a1, 123b1. Subsequently, a first radial bearing portion R11 and a second radial bearing portion R12 which rotatably support the shaft member 102 in the radial direction in a non-contact manner are formed by the pressure of these oil films. Moreover, the pressure of the lubricating oil films formed the thrust bearing gap between the lower end face 8b of the bearing sleeve 8 and the thrust hydrodynamic groove region 122a of the upper side (the shaft portion side) of the flange portion 122 facing the lower end face 8b, and the thrust bearing gap between the upper end face 7b1 of the bottom 7b and the thrust hydrodynamic groove region 122b of the lower side (opposite to the shaft portion side) of the flange portion 122 facing the upper end face 7b1 is increased by the hydrodynamic effect of the hydrodynamic grooves 122a1, 122b1. Subsequently, a first thrust bearing portion T11 and a second thrust bearing portion T12 which rotatably support the shaft member 102 in the thrust direction in a non-contact manner are formed by the pressure of these oil films.

A method for producing of the shaft member 102 constituting the above hydrodynamic bearing apparatus 101 will be described below.

The shaft member 102 is produced in mainly two steps: (C) forming step and (D) grinding step. Among them, the (C) forming step comprises a shaft material forming process (C-1), a thrust hydrodynamic groove region forming process (C-2), a radial hydrodynamic groove region forming process (C-3), and a shaft portion correcting process (C-4). The (D) grinding step comprises a width grinding process (D-1), a full-face grinding process (D-2), and a finish grinding process (D-3).

Figure 17:
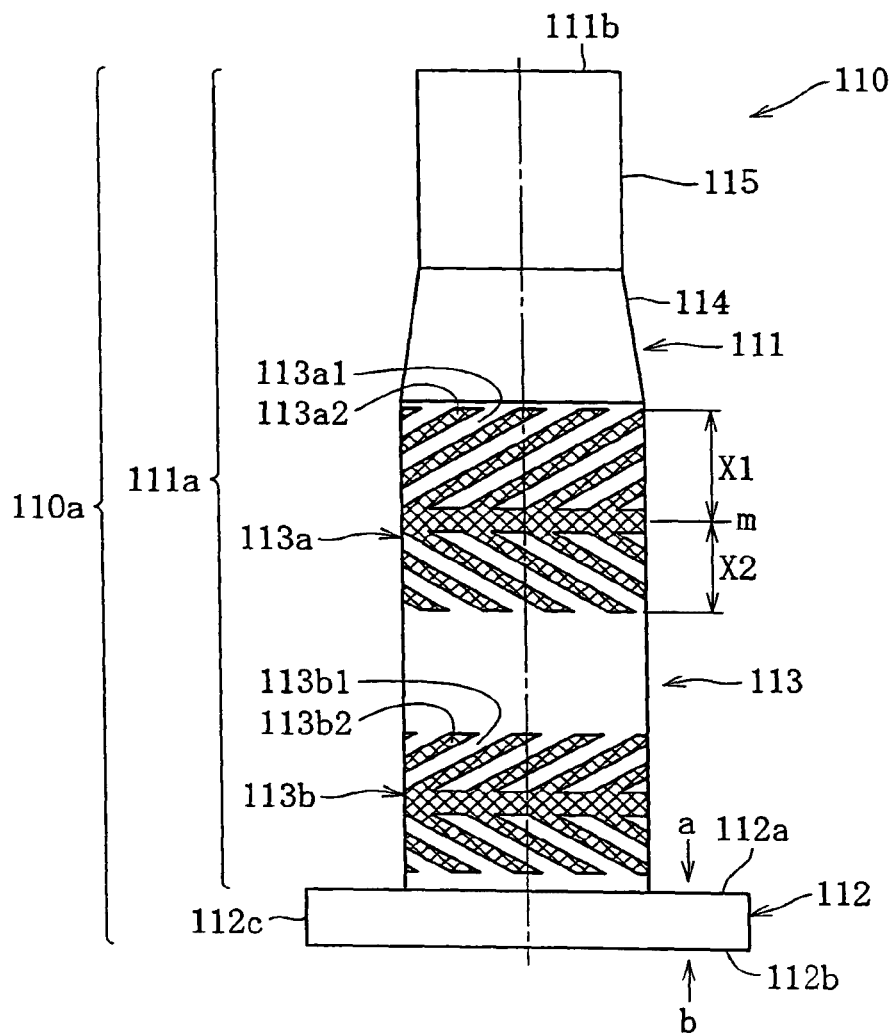
FIG. 17 is a side elevational view of a shaft material formed by a forging process.
Figure 18:
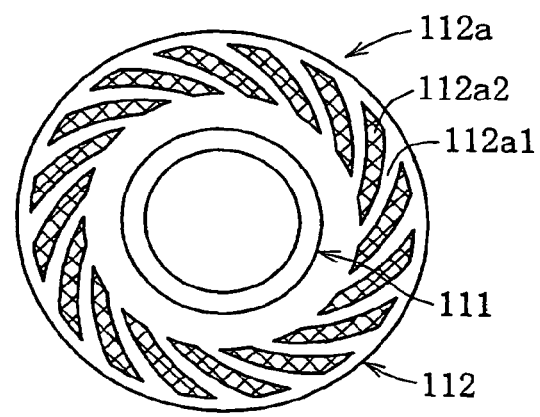
FIG. 18 is a top view of the flange portion of a shaft material seen from the direction of arrow A.
Figure 19:
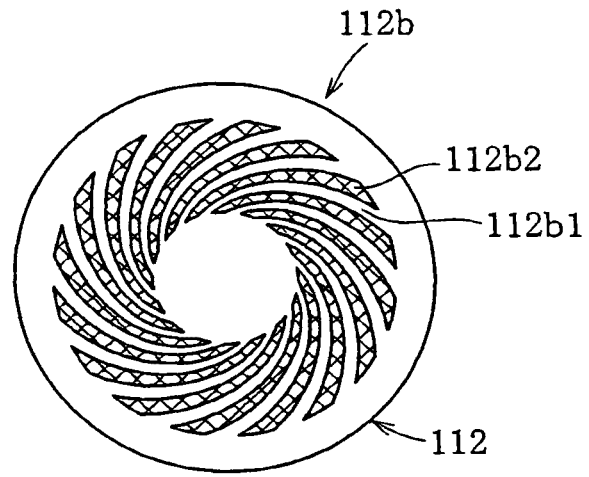
FIG. 19 is a bottom view of the flange portion of a shaft material seen from the direction of arrow B.

(C) Forming Step (C-1) Shaft Material Forming Process and (C-2) Thrust Hydrodynamic Groove Region Forming Process To begin with, a material of the shaft member 102 to be formed, i.e., a metal material such as stainless steel is compression-formed (forging process) by using molds, for example, as shown in FIG. 17, in a cold state, whereby the shaft material 110 integrally having the region 111 corresponding to the shaft portion (hereinafter referred to simply as a shaft portion) and the region 112 corresponding to the flange portion (hereinafter referred to simply as a flange portion) is formed (shaft material forming process (C-1)). The molds used in the forge forming of this shaft material 110 also serves as the molds for forming thrust hydrodynamic groove regions 112a, 112b on the flange portion 112 in this embodiment. Accordingly, simultaneously with the forge forming of the shaft material 110, plastic processing is performed in the positions corresponding to both end faces of the flange portion 112. For example, as shown in FIGS. 18 and 19, thrust hydrodynamic groove regions 112a (the shaft portion side), 112b (opposite to the shaft portion side) comprising a plurality of hydrodynamic groove 112a1, 112b1 and demarcation portions 112a2, 112b2 demarcating these hydrodynamic grooves 112a1, 112b1 are formed (thrust hydrodynamic groove region formation process (C-2)).

A method of cold-forging employed in the above forming step may be extrusion, upsetting, heading or the like, or combinations of them. In the example shown in FIG. 17, the outer circumferential surface 111a of the shaft portion 111 after the forging process has a different diameter shape in which a tapered face 114 and a cylinder face 115, which is upwardly continuous with the tapered face 114 and has a diameter smaller than other portions, are disposed therebetween, and the tapered face 114 may be dispensed with and formed to have a uniform dimer throughout its length. Note that described in this embodiment is the case where the forming of the shaft material 110 and the forming of the thrust hydrodynamic groove regions 112a, 112b are conducted simultaneously by the forging process. However, both steps need not necessarily be performed simultaneously, and the thrust hydrodynamic groove regions 112a, 112b may be formed by plastic processing, for example, a forging process, pressing process or the like after forming the shaft material 110 by forging.

(C-3) Radial Hydrodynamic Groove Region Forming Process and (C-4) Shaft Portion Correcting Process The shaft portion 111 of the shaft material 110 formed by forging in the previous step is pressurized a pair of rolling dies (for example, round dies, flat dies, etc.), for example, in the shape shown in FIG. 6 or 7 and the pair of rolling dies are reciprocated in the directions opposite to each other so that a hydrodynamic groove transcription face previously formed on the holding face of either of the pair of rolling dies are transcribed (radial hydrodynamic groove region forming process (C-3)) on the outer circumferential surface 111a of the shaft portion 111. Since the above pair of rolling dies in this embodiment also serves as a correcting tool for correcting the shaft portion 111 of the shaft material 110, a rolling process for correcting cylindricity is conducted (shaft portion correcting process (C-4)) on the outer circumferential surface 111a of the shaft portion 111 simultaneously with transcription of the above hydrodynamic grooves.

As a result, for example, radial hydrodynamic groove regions 113a, 113b having the shape shown in FIG. 17 are formed at two axially separated positions on the outer circumferential surface 111a of the shaft portion 111, while out of the outer circumferential surface 111a of the shaft portion, a face 113 including radial hydrodynamic groove regions 113a, 113b (for example, the bottom faces of hydrodynamic grooves 113a1, 113b1 and the outer circumferential surfaces of demarcation portions 113a2, 113b2 demarcating the hydrodynamic grooves 113a1, 113b1) is corrected, and the cylindricity of the face 113 subjected to the correcting process is improved to be within a desired range (for example, 10 μm or lower). Simultaneously, the cylinder face 115 of the upper end of the shaft portion 111 is also subjected to a correcting process, and the cylindricity of the cylinder face 115 is improved similarly.

As mentioned above, forming of the radial hydrodynamic groove regions 113a, 113b and correction of the outer circumferential surface 111a of the shaft portion can be both performed simultaneously by rolling. Additionally, for example, after a correcting process is performed on the outer circumferential surface 111a of the shaft portion 111, a procedure to perform a rolling process of the radial hydrodynamic groove regions 113a, 113b on the face subjected to the correcting process can be also employed. In that case, various processing methods including a rolling process, drawing, ironing, sizing by pressing split-cavity molds (clipping) and the like, can be employed in the correcting process of the cylindricity. Moreover, the correcting process is performed throughout the length of the outer circumferential surface 111a of the shaft portion 111, or can be conducted on a part of the outer circumferential surface 111a as long as the part includes the radial hydrodynamic groove regions 113a, 113b.

As mentioned above, the forming of the shaft material 110 integrally comprising the shaft portion 111 and flange portion 112 and the forming of the thrust hydrodynamic groove regions 112a, 112b on both end faces of the flange portion 112 are simultaneously performed both by forging, and in addition, the forming of the radial hydrodynamic groove regions 113a, 113b and the correcting process of the outer circumferential surface 111a of the shaft portion are performed simultaneously both by rolling, whereby such processing steps can be simplified and machining time can be greatly shortened. Moreover, compared to cutting or etching, etc., employing forging processes and rolling processes in which the cycle time per processed item is shorter can further shorten the machining time, enabling further cost reduction and improvement in mass productivity.

Figure 20:
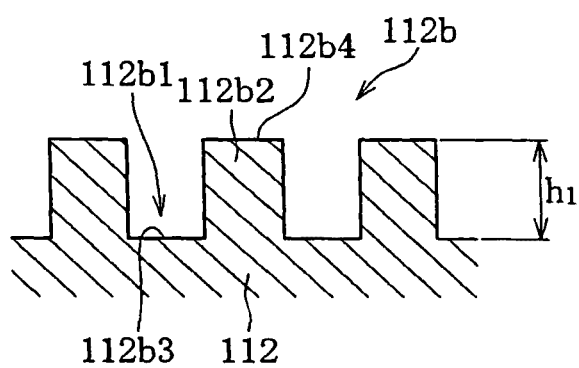
FIG. 20 is an expanded sectional view of a thrust hydrodynamic groove region formed on the end face of a flange portion on the side opposite to the shaft portion prior to grinding.

At the stage where the above forming step (C) has been completed, for example, as shown in FIG. 20, the height h1 from the bottom face 112b3 of the hydrodynamic groove 112b1 to the axial end face 112b4 of the demarcation portion 112b2 in the thrust hydrodynamic groove region 112b is set to a suitable value considering the forming accuracy in the above forging process and the grinding allowance in the width grinding (D-1) of the shaft material 110 described later. The height (not shown) from the bottom faces of the hydrodynamic grooves 113a1, 113b1 in the radial hydrodynamic groove regions 113a, 113b to the outer circumferential surfaces of the demarcation portions 113a2, 113b2, and the height (not shown) from the bottom faces of the hydrodynamic groove 112a1 in the thrust hydrodynamic groove region 112a on the shaft portion 111 side to the axial end faces of the demarcation portion 112a2 are set to suitable values considering the forming accuracy in the above forging process, and the full-face grinding (D-2) of the shaft material 110 described later and the grinding allowance in the finish grinding (D-3).

(D) Grinding Step (D-1) Width Grinding

Figure 9:
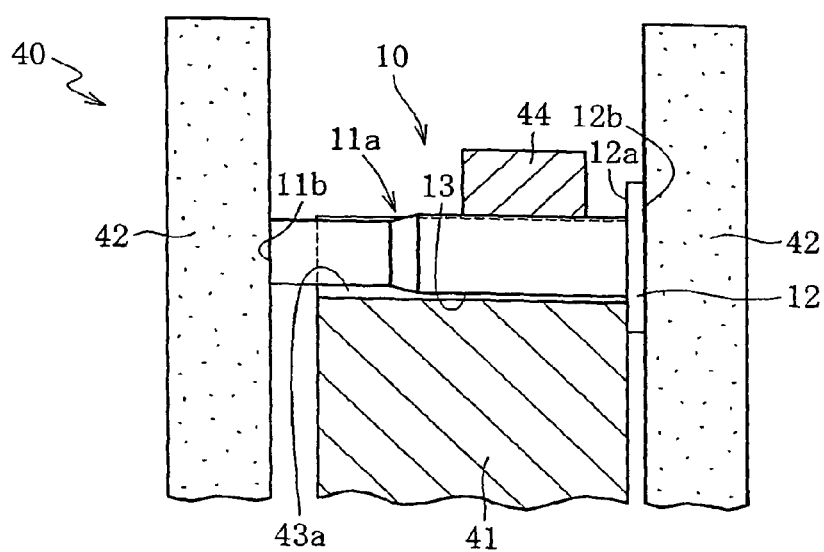
FIG. 9 is a partial cross-sectional view showing an example of a grinding apparatus according to the width grinding step.

The end face on the side opposite to the shaft portion on the side on which the end face 111b of the shaft portion and the thrust hydrodynamic groove region 112b of the flange portion 112, which will be the two end faces of the shaft material 110 after being subjected to the forming step are formed (refer to FIG. 19) is ground relative to the corrected face 113 mentioned above. A grinding apparatus used in this grinding step comprises, as shown in FIGS. 8 and 9, a carrier 41 retaining a plurality of the shaft materials 110 as workpieces; and a pair of grind stones 42, 42 which grind the end face opposite to the shaft portion side comprising the end face 111b of the shaft portion of the shaft material 110 retained by the carrier 41 and the thrust hydrodynamic groove region 112b of the flange portion 112, as in the first embodiment. Note that other constitutions of the grinding apparatus 40 than this are based on the first embodiment, and their explanations are thus omitted.

As the carrier 41 rotates, the shaft material 110 is sequentially loaded into the notch 43 from a fixed position. The loaded shaft material 110 traverses the end faces of the rotating grind stones 42, 42 from their outer diameter edge toward the inside diameter edge, while being prevented from falling off from the notch 43 by binding of the belt 44. Accordingly, both end faces of the shaft material 110, namely the end face 111b of the shaft portion and the end face of the flange portion 112 on the side opposite to the shaft portion comprising the thrust hydrodynamic groove region 112b are ground by the end faces of the grind stones 42, 42 (refer to FIG. 9). Moreover, the width of the shaft material 110 in the axial direction (the entire length including the flange portion 112) is finished to have a predetermined size.

Figure 21:
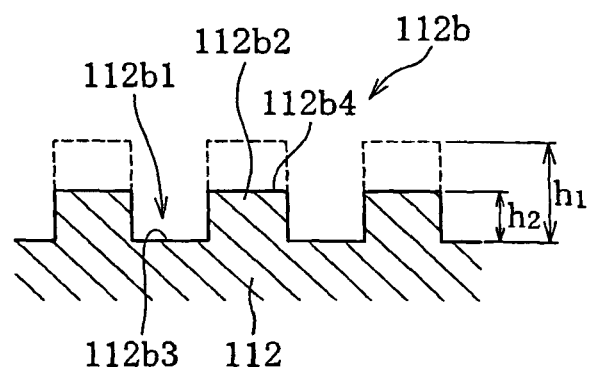
FIG. 21 is an expanded sectional view of a thrust hydrodynamic groove region after being ground.

In this grinding step, as mentioned above, the thrust hydrodynamic groove region 112b of the flange portion 112 is ground, for example, in such a manner that the demarcation portion 112b2 is ground by a predetermined grinding allowance (h1-h2 in FIG. 21) from the height h1 at the time of forging, as shown in FIG. 21. This renders the height of the demarcation portion 112b2 (the depth of the hydrodynamic groove 112b1) to be the same as the predetermined value h2 (for example, 3 μm-15 μm). Therefore, the thrust bearing gap between the component facing it (in this embodiment, the bottom 7b of the housing 7) and itself can be controlled highly accurately at the interval of a several micrometers to several ten micrometers.

(D-2) Full-Face Grinding Process

Subsequently, relative to the ground two end faces of the shaft material 110 (the end face 111b of the shaft portion, the end face of the flange portion 112 on the side opposite to the shaft portion comprising the thrust hydrodynamic groove region 112b), the outer circumferential surface 110a of the shaft material 110 and the end face of the flange portion 112 on the shaft portion side comprising the thrust hydrodynamic groove region 112a are ground. A grinding apparatus used in this grinding step conduct plunge-grinding by the grind stone 53, with the back plate 54 and pressure plate 55 pressed against both end faces of the shaft material 110, as in the first embodiment shown in FIG. 10. The corrected face 13 of the shaft material 110 is rotatably supported by a shoe 52. Note that other constitutions of the grinding apparatus 50 than this is based on the first embodiment and their explanations are thus omitted.

Grinding in the grinding apparatus 50 of the above constitution is performed in the following procedure. To begin with, while the shaft material 110 and the grind stone 53 are in rotation, the grind stone 53 is fed obliquely (the direction of arrow 1 in FIG. 10), the plane grinding portion 56b of the grind stone 53 is pressed against the end face of the flange portion 112 on the shaft portion side of the shaft material 110, the end face of the flange portion 112 on the shaft portion side (on the thrust hydrodynamic groove region 112a side) comprising the thrust hydrodynamic groove region 112a is ground. Accordingly, the end face of the flange portion 122 of the shaft member 102 on the shaft portion side is formed, and grinding of the thrust hydrodynamic groove region 112a is completed, and the thrust hydrodynamic groove region 122a of the shaft member 102 is formed. Subsequently, the grind stone 53 is fed in the direction perpendicularly intersecting the rotation axis of the shaft material 110 (the direction of arrow 2 in FIG. 10), the cylinder grinding portion 56a of the grind stone 53 is pressed against the outer circumferential surface 111a of the shaft portion 111 of the shaft material 110 and the outer circumferential surface 112c of the flange portion 112 to grind the faces 111a, 112c. Accordingly, out of the outer circumferential surface of the shaft portion 121 of the shaft member 102, the radial hydrodynamic groove region 123a, 123b and the region corresponding to the cylinder face 125 are ground, while the tapered face 124, the outer circumferential surface 122c of the flange portion 122, and the recess portions 126-128 are further formed.

In this grinding step (full-face grinding process), the demarcation portion 112a2 of the thrust hydrodynamic groove region 112a formed on the end face of the flange portion 112 on the shaft portion side is ground, for example, by a predetermined grinding allowance from the height at the time of forging, similarly to the case of the thrust hydrodynamic groove region 112b, although not shown in the Figs. This renders the height of the demarcation portion 112a2 (the depth of the hydrodynamic groove 112a1) to have a predetermined value, whereby the thrust bearing gap between the component facing it (the lower end face 8b of the bearing sleeve 8 in this embodiment) and itself is highly accurately controlled. In this embodiment, since the accuracy setting of the perpendicularity of both end faces of the shaft material 110 (the end face 111b of the shaft portion, the end face of the flange portion 112 on the side opposite to the shaft portion) has been performed previously in the width grinding process, grinding of the thrust hydrodynamic groove region 112a can be conducted more precisely.

(D-3) Finish Grinding Process (D-2) Among the faces which have been ground in full-face grinding process, the radial hydrodynamic groove regions 123a, 123b of the shaft member 102 and the region corresponding to the cylinder face 125 are subjected to the final finish grinding. As in the first embodiment, a grinding apparatus used in this grinding is a cylinder grinder shown in FIG. 11. It performs plunge grinding by the grind stone 63 while rotating the shaft material 110 held between the back plate 64 and the pressure plate 65. Note that other constitutions of the grinding apparatus 60 are based on the first embodiment, and their explanations are thus omitted.

In the grinding apparatus 60 having the above constitution, the rotating grind stone 63 is provided with the feed in the radial direction so that the radial hydrodynamic groove regions 123a, 123b and the regions 113a, 113b and 115 corresponding to the cylinder face 125 are ground, and these regions are finished to have the final surface accuracy. In this grinding step, similarly to the case of the thrust hydrodynamic groove regions 112a, 112b, the demarcation portions 113a2, 113b2 of the radial hydrodynamic groove regions 113a, 113b is ground, for example, by a predetermined grinding allowance from the height at the time of rolling, although not shown in the Figs. This renders the heights of the demarcation portions 113a2, 113b2 (the depth of hydrodynamic grooves 113a1, 113b1) to have a predetermined value, enabling to highly accurately control the radial bearing gap between the component facing it (in this embodiment, the cylinder face 8a of the bearing sleeve 8) and itself.

After being subjected to the above (C) forming step and (D) grinding step, the shaft member 102 shown in FIG. 13 is completed by performing, if necessary, heat treatment and cleaning process.

The shaft member 102 produced by the above production method has the radial hydrodynamic groove regions 123a, 123b formed at two separate upper and lower portions on the outer periphery of the shaft portion 121 by a rolling process, and has such a structure that the outer circumferential surfaces of the demarcation portions 123a2, 123b2 of the radial hydrodynamic groove regions 123a, 123b are the grinding surfaces. It also has the thrust hydrodynamic groove regions 122a, 122b formed by a forging process on both end faces of the flange portion 122, and has such a structure that the axial end faces of the thrust hydrodynamic groove regions 122a, 122b are the grinding surfaces. The grinding surfaces of the demarcation portions 123a2, 123b2 in the radial hydrodynamic groove regions 123a, 123b are formed in the (D-2) full-face grinding process and (D-3) finish grinding process. Moreover, the grinding surface of the demarcation portion 122a2 in the thrust hydrodynamic groove region 122a is formed in the (D-2) full-face grinding process, and the grinding surface is formed in the (D-1) width grinding process of the demarcation portion 122b2 in the thrust hydrodynamic groove region 122b.

As mentioned above, the radial hydrodynamic groove regions 113a, 113b of the shaft material 110 are formed by a rolling process, and among the radial hydrodynamic groove regions 113a, 113b, the outer diameter portions of the demarcation portions 113a2, 113b2 are ground, whereby the hydrodynamic grooves region 123a, 123b can be formed at reduced costs, while the dimensional accuracy of their outer diameters and surface roughness can be highly accurately finished. As for the thrust hydrodynamic groove regions 122a, 122b, low-cost forming and high-accuracy finish can be achieved at the same time for the same reason. This allows the radial bearing gap and thrust bearing gap in the hydrodynamic bearing apparatus 101 to be controlled highly accurately, enabling to produce stable bearing performance.

According to the above production method, it is also possible to highly accurately finish the cylindricity of the radial hydrodynamic groove regions 123a, 123b formed on the outer periphery of the shaft portion 121. Accordingly, for example pressure, variation of the radial bearing gap formed between the cylinder face 8a of the inner periphery of the bearing sleeve 8 in the bearing apparatus 101 and the hydrodynamic groove regions in the circumferential direction or axial direction is suppressed to fall within a predetermined range, and bearing performance can be prevented from being adversely affected by the variation of the above radial bearing gap. Moreover, the grinding allowance of the demarcation portion in grinding (h1-h2 in FIG. 21) varies depending on the forming accuracy in forging or rolling. As shown in this embodiment, the cylindricity of the shaft portion 121 is corrected so that in particular the forming accuracy of the demarcation portions 123a2, 123b2 in the radial hydrodynamic groove region 123a, 123b can be improved and the grinding allowance in grinding can be reduced. This enables to further shorten machining time and reduce processing costs. Alternatively, the forming accuracy of the hydrodynamic groove region in forging or rolling is preliminarily increased, whereby the grinding allowance in grinding can be reduced.

As mentioned above, if the radial hydrodynamic groove regions 123a, 123b are formed on the outer periphery of the shaft member 102, hydrodynamic grooves need not be processed on the inner periphery of the bearing sleeve 8. The inner periphery of the bearing sleeve 8 can serve as the cylinder face 8a, reducing such related costs. Moreover, if hydrodynamic grooves need not be processed on the inner periphery of the bearing sleeve 8, it is unnecessary to form the bearing sleeve 8 and the housing 7 as separate components. Therefore, these components can be unified (with a resin or the like), although not shown in the Figs. This can reduce the number of parts and related production costs.

In the second embodiment described above, the case where the radial hydrodynamic groove regions 113a, 113b are formed by a rolling process is described, but alternatively, for example, the forging of the shaft material 110 and the thrust hydrodynamic groove regions 112a, 112b can be conducted simultaneously with the forming of the radial hydrodynamic groove regions 113a, 113b by forging. In this case, the shape of the hydrodynamic grooves by forging is not particularly limited, and may be, for example, a herringbone shape, a spiral shape, or other various hydrodynamic groove shapes.

In the second embodiment, described was the case where the thrust hydrodynamic groove regions 122a, 122b are formed on both end faces of the flange portion 122. However, it is not particularly limited to this form, and, for example, the thrust hydrodynamic groove regions may be formed on the side of the lower end face 8b of the bearing sleeve 8 and the upper end face 7b1 of the bottom 7b facing the two end faces of the flange portion 122, respectively.

In the embodiments described above (the first and second embodiments), for example, bearings using hydrodynamic pressure producing parts comprising hydrodynamic grooves arranged in a herringbone shape and a spiral shape are shown as examples of the hydrodynamic bearing which constitutes the radial bearing portions R1, R2, R11, R12 and the thrust bearing portions T1, T2, T11, T12. However, the constitution of the hydrodynamic pressure producing parts is not limited to these. As the radial bearing portions R1, R2, R11, R12, for example, multirobe bearing, step bearing, taper bearing, taper flat bearing or the like may be used. As the thrust bearing portions T1, T2, T11, T12, step pocket bearing, taper pocket bearing, taper flat bearing and the like may be used.

In the embodiments described above, a lubricating oil is mentioned as an example of a fluid which fills the inside of the hydrodynamic bearing apparatus 1, 101 and produces hydrodynamic effect in the radial bearing gap between the bearing sleeve 8 and the shaft member 2, 102 and the thrust bearing gap between the bearing sleeve 8 and housing 7 and the shaft member 2, 102. However, it is not particularly limited to this fluid. A fluid which can produce hydrodynamic effect in the bearing gaps having hydrodynamic groove regions, for example, a gas such as air and a lubricant having fluidity such as a magnetic fluid may be used.

The hydrodynamic bearing apparatus according to the present invention is suitable for spindle motors of information appliances, for example, magnetic disk apparatuses such as HDD, optical disk apparatuses such as CD-ROM, CD-R/RW, DVD-ROM/RAM, magneto-optic disk apparatuses such as MD and MO, etc., polygon scanner motors of laser beam printers (LBP), and other small motors.

The invention claimed is:

1. A method for producing a shaft member for a hydrodynamic bearing apparatus, said method comprising:
    forming a shaft material which integrally has a shaft portion with a first end and a second end, and a flange portion located at the first end of the shaft portion by a forging process, the shaft portion having an end face facing in a first direction along a longitudinal axis of the shaft material at the second end of the shaft portion, and the flange portion having an end face facing in a second direction, opposite to the first direction, along the longitudinal axis of the shaft material at an end of the flange portion;
    grinding, by a grinding process, both the end face of the shaft portion and the end face of the flange portion of the shaft material formed by the forging process; and
    forming, by another grinding process, first and second radial bearing surfaces at two positions separate from one another along the longitudinal axis of the shaft material and a slanting recess portion between the first and second radial bearing surfaces that has a diameter that is smaller than a diameter of both the first and second radial bearing surfaces on an outer circumference of the shaft portion of the shaft material formed by the forging process,
    wherein the grinding of the end face of the shaft portion and the grinding of the end face of the flange portion in the grinding process are performed by using a pair of grind stones having parallel end faces, the parallel end faces facing each other, and are performed concurrently by traversing the shaft material between the parallel end faces of the pair of grind stones from an outer diameter edge toward an inside diameter edge of the parallel end faces, while the grind stones rotate and the shaft material is retained by a carrier, thereby the end face of the shaft portion and the end face of the flange portion are ground by the parallel end faces of the pair of grind stones, and are finished to have a flat shape without projection,
    wherein the grinding of the end face of the shaft portion and the grinding of the end face of the flange portion are performed before the grinding of the slanting recess portion and the grinding of the first and second radial bearing surfaces, and
    wherein the grinding of the slanting recess portion and the grinding of the first and second radial bearing surfaces in the another grinding process are performed concurrently using the ground end face of the shaft portion and the ground end face of the flange portion as reference planes.

2. A method for producing a shaft member for a hydrodynamic bearing apparatus according to claim 1, further comprising grinding another end face of the flange portion that faces in the first direction along the longitudinal axis of the shaft material.

3. A method for producing a shaft member for a hydrodynamic bearing apparatus according to claim 2, further comprising, after having performed the other grinding process, grinding a region of the outer circumference of the shaft portion of the shaft material excluding the slanting recess portion.

4. A method for producing a shaft member for a hydrodynamic bearing apparatus according to claim 1, further comprising, after having performed the other grinding process, grinding a region of the outer circumference of the shaft portion of the shaft material excluding the slanting recess portion.

* * * * *